(12) United States Patent
Terada

(10) Patent No.: US 7,293,040 B2
(45) Date of Patent: Nov. 6, 2007

(54) SYSTEM AND METHODOLOGY FOR DATABASE MIGRATION BETWEEN PLATFORMS

(75) Inventor: Katsunori Terada, Dublin, CA (US)

(73) Assignee: Sybase, Inc., Dublin, CA (US)

( * ) Notice: Subject to any disclaimer, the term of this patent is extended or adjusted under 35 U.S.C. 154(b) by 256 days.

(21) Appl. No.: 10/906,652

(22) Filed: Feb. 28, 2005

(65) Prior Publication Data

US 2006/0184561 A1    Aug. 17, 2006

Related U.S. Application Data

(60) Provisional application No. 60/593,772, filed on Feb. 11, 2005.

(51) Int. Cl.
*G06F 17/30*    (2006.01)
(52) U.S. Cl. .................................................. 707/102
(58) Field of Classification Search ............. 707/1–10, 707/100–104.1, 200–206; 715/762, 863
See application file for complete search history.

(56) References Cited

U.S. PATENT DOCUMENTS 6,351,750 B1 * 2/2002 Duga et al. ................ 707/102

2005/0071769 A1 * 3/2005 Suzuki et al. ............... 715/762
2005/0091615 A1 * 4/2005 Suzuki ........................ 715/863

OTHER PUBLICATIONS

An Introduction to Database Systems (Ch 1-4), 7th Ed., Addison Wesley, 2000.
Information Technology—Database languages—SQL, American National Standard ANSI/ISO/IEC 9075: 1992.
Information Technology—Database languages—SQL (Ch 4), American National Standard ANSI/ISO/IEC 9075: 1992.

* cited by examiner

*Primary Examiner*—Diane Mizrahi
(74) *Attorney, Agent, or Firm*—John A. Smart; G. Mack Riddle

(57) ABSTRACT

A system and methodology for database migration between platforms is described. In one embodiment, for example, a method is described for migrating a database across platforms having different byte order formats (e.g., big-endian and little-endian), the method comprises steps of: when the database is loaded on a given platform, determining whether the database requires conversion to match the byte order format of the given platform; identifying particular portions of the database to be converted if the database is determined to require conversion; and converting the particular portions of the database to the byte order format of the given platform.

44 Claims, 8 Drawing Sheets

SYSTEM AND METHODOLOGY FOR DATABASE MIGRATION BETWEEN PLATFORMS

CROSS REFERENCE TO RELATED APPLICATIONS

The present application is related to and claims the benefit of priority of the following commonly-owned, presently-pending provisional application(s): application Ser. No. 60/593,772, filed Feb. 11, 2005, entitled "System and Methodology for Database Migration between Platforms", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 215863 Bytes, created: Feb. 28, 2005 2:54:56 PM; Object ID: File No. 1; Object Contents: Source code.

BACKGROUND OF INVENTION

1. Field of the Invention

The present invention relates generally to data processing environments and, more particularly, to a system providing methodology for migration of databases between platforms having different byte storage architectures.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

Database systems have been in broad use for a number of years performing various types of applications on a wide range of computer hardware platforms. In this type of heterogeneous environment, users of database systems frequently have a need to migrate existing databases from one platform to another. For example, in recent years computer systems running the Linux operating system have become more widely used, and many database users are interested in migrating their existing databases to new Linux platforms. Database management systems typically include archive functionality enabling a user to save the data from the database to an archive system or device, such as tape. The archive can be used to restore the database (e.g., in the event the database is corrupted or damaged). This archive functionality can also be used for purposes of migrating a database from a first or "source" machine to a second or "target" machine (e.g., in the event the user wants to change the machine on which the database is used).

If the hardware platform and operating system of the source and target machines are the same, a physical backup mechanism can be used for migrating the data to the target machine. In this case, the user can simply make a backup or archive of the database on the source machine and load this archive onto the target machine using standard database commands. For example, a database DUMP command can be used on source platform to store the database in an archive and a database LOAD command can be used to load the database on the target platform from the archive. Dump and load operations are physical database back-up operations in a database system which can be used to move a database from one machine to another. However, if the architecture of the source and target platforms differ, it may not be possible to use this type of physical backup mechanism.

Some computers, such as IBM mainframes and Sun Solaris machines, have a "big-endian" byte storage architecture, while many other computers, including PCs and Linux platforms, use a "little-endian" byte storage architecture. A few computer systems are bi-endian in that they can understand both systems. The terms "big-endian" and "little-endian" refer to which bytes are most significant in multi-byte data types and describe the order in which a sequence of bytes is stored in a computer's memory. In a big-endian system, the most significant value in the sequence is stored at the lowest storage address (i.e., first). In a little-endian system, the least significant value in the sequence is stored first. For example, consider the number 1025 (2 to the tenth power plus one) stored in a 4-byte integer: 00000000 00000000 00000100 00000001.

The big-endian representation of 1025 is as follows:
Address 00: 00000000
Address 01: 00000000
Address 02: 00000100
Address 03: 00000001

The little-endian representation of 1025 is as follows:
Address 00: 00000001

Address 01: 00000100
Address 02: 00000000
Address 03: 00000000

Note that the example above shows only big- and little-endian byte orders. The bit ordering within each byte can also be big- or little-endian, and some architectures actually use big-endian ordering for bits and little-endian ordering for bytes, or vice versa. Converting data between the big-endian and little-endian systems is sometimes referred to as the "NUXI" problem. Imagine the word UNIX stored in two 2-byte words. In a big-endian system, it would be stored as UNIX. However, in a little-endian system, it would be stored as NUXI.

Currently, a user wanting to migrate a database from a big-endian platform (e.g., Solaris) to a little-endian platform (e.g., Linux) cannot use the above-described physical backup mechanism because of incompatibilities between the byte storage format of the two platforms. The same limitation is also applicable to migration of a database from a little-endian platform to a big-endian platform. A user wishing to migrate a database between a source platform and a target platform having different endian types currently must do so using logical backup mechanisms. Logical backup mechanisms generally require the user to issue commands for each table in the database, which is a particularly lengthy and tedious operation if the database is large and has numerous tables (e.g., 10,000 tables). Also, the user must recreate the database schema on the target platform as well as recreate stored procedures and so forth. As a result, the process of migrating a database using a logical backup mechanism is very slow.

Some database systems include tools and utilities that may assist a user in logical backup operations. For example, Sybase® Adaptive Server® Enterprise (ASE) includes a bulk copy (bcp) utility that can automate portions of this logical backup process. However, these tools and utilities do not fully automate the process and the user still must define the format of the backup files. For example, migration of a database using a bcp-out/bcp-in method requires an export/import operation to be done for each table in the database. Also, users are required to recreate the database schema on the target platform (i.e., create table SQL command, etc.). As a result, performing a database migration using these tools remains a slow and tedious process that typically requires many hours or several days to complete. Moreover, users cannot access the data in the database during this migration process. All told, this current logical backup approach for moving a database from one platform to another where endian type is different is very cumbersome and complicated for users. It is also a very slow process that disrupts normal system operations.

What is needed is a solution that will allow users to more easily and quickly migrate databases between platforms having a different underlying byte storage architecture (endian type). The solution should automate the migration process so that a user of a database system could simply load an archive file that was generated on a machine having a different byte-order. Ideally, the solution should also migrate the database's schema and its stored procedures to the target platform so that the user is not required to recreate the database's schema and stored procedures on the target platform. The present invention provides a solution for these and other needs.

SUMMARY OF INVENTION

A system and methodology for database migration between platforms is described. In one embodiment, for example, a method of the present invention is described for migrating a database across platforms having different byte order formats (e.g., big-endian and little-endian), the method comprises steps of: when the database is loaded on a given platform, determining whether the database requires conversion to match the byte order format of the given platform; identifying particular portions of the database to be converted if the database is determined to require conversion; and converting the particular portions of the database to the byte order format of the given platform.

In another embodiment, for example, a method of the present invention is described for converting a database operating on a source platform having a certain endian type (e.g., big-endian byte order) for operation on a target platform having a different endian type (e.g., little-endian byte order), the method comprises steps of: translating objects of the database to the target platform's endian type; determining particular portions of the database to be converted based on scanning the translated objects of the database; and for each particular portion of the database, converting the particular portion to the target platform's endian type.

In yet another embodiment, for example, a system of the present invention for converting a database operating on a first platform having a certain endian type for operation on a second platform having a different endian type is described that comprises: a module for translating system objects of the database to the endian type of the second platform; a module for determining particular portions of the database to be converted to the endian type of the second platform based on the translated system objects; and a module for converting the particular portions of the database to the endian type of the second platform.

In another embodiment, for example, a method of the present invention is described for migrating a database to a target platform having a particular byte order format (endian type), the method comprises steps of: determining whether the byte order format of the database differs from the particular byte order format of the target platform when the database is loaded on the target platform; if the byte order format of the database differs from that of the target platform, translating system tables of the database to the particular byte order format of the target platform; building a translation dictionary identifying particular portions of the database to be converted based on scanning the translated system tables of the database; and converting the particular portions of the database to the particular byte order format of the target platform based on the translation dictionary.

In still another embodiment, for example, a system of the present invention providing for conversion of a database across platforms having different byte storage formats (endian types) is described that comprises: means for detecting the byte storage format of the database when the database is loaded on a particular platform and determining whether the database requires conversion to match the byte storage format of the particular platform; means for identifying portions of the database to be converted to match the byte storage format of the particular platform if the database is determined to require conversion; and means, responsive to the means for identifying, for converting portions of the database to the byte storage format of the particular platform.

DETAILED DESCRIPTION

GLOSSARY

Figure 1:
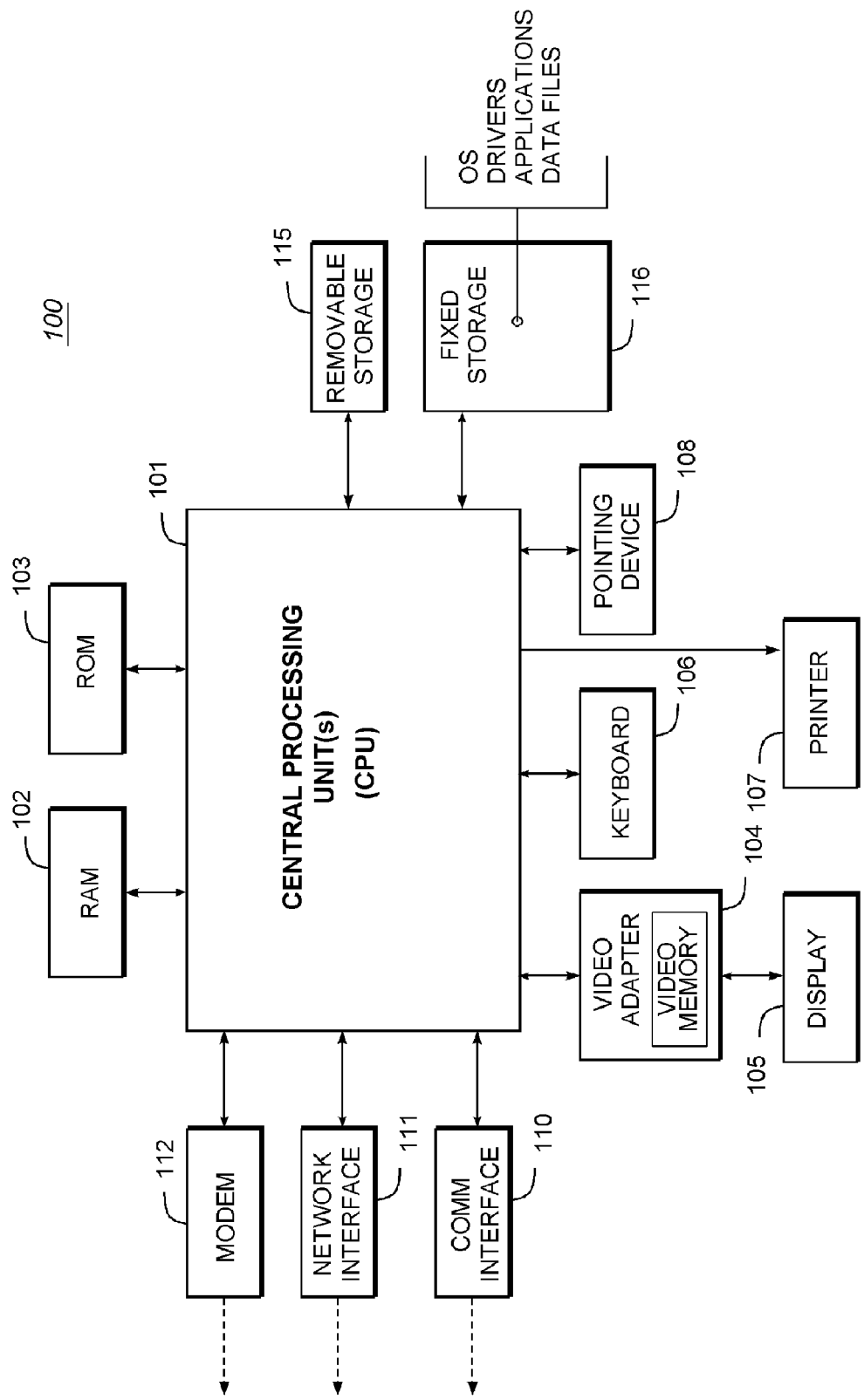
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Big-endian: A format for storage of a sequence of bytes in system memory in which the most significant byte has the lowest address (i.e., MSB is stored first). Most of the various RISC designs are big-endian. For example, Sun's SPARC, Motorola's 68K, and the Power PC families are big-endian platforms.

Byte-order: Byte order refers to endianness (i.e., big-endian or little-endian byte storage format).

Byte-swap: Byte swap refers to conversion of integer/float data which is needed between big-endian and little-endian platforms. The present invention currently supports three kinds of primitive byte-swap conversions: 2 byte, 4 byte and 8 byte.

Endianness: The endianness of a platform refers to whether it is a big-endian or little-endian platform. The terms "big-endian" and "little-endian" refer to which bytes are most significant in multi-byte data types and describe the order in which a sequence of bytes is stored in a computer's memory.

Little-endian: A format for storage of a sequence of bytes in system memory in which bytes at lower addresses have lower significance (i.e., LSB is stored first). The VAX families of computers and Intel x86 families are little-endian.

LSB or Least Significant Byte: The byte in a multi-byte word that represents the least significant value.

MSB or Most Significant Byte: The byte in a multi-byte word that represents the most significant value.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, such as Microsoft Windows 9x, Microsoft Windows NT, Microsoft Windows 2000, or Microsoft Windows XP (all available from Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

Client-Server Database Management System

Figure 2:
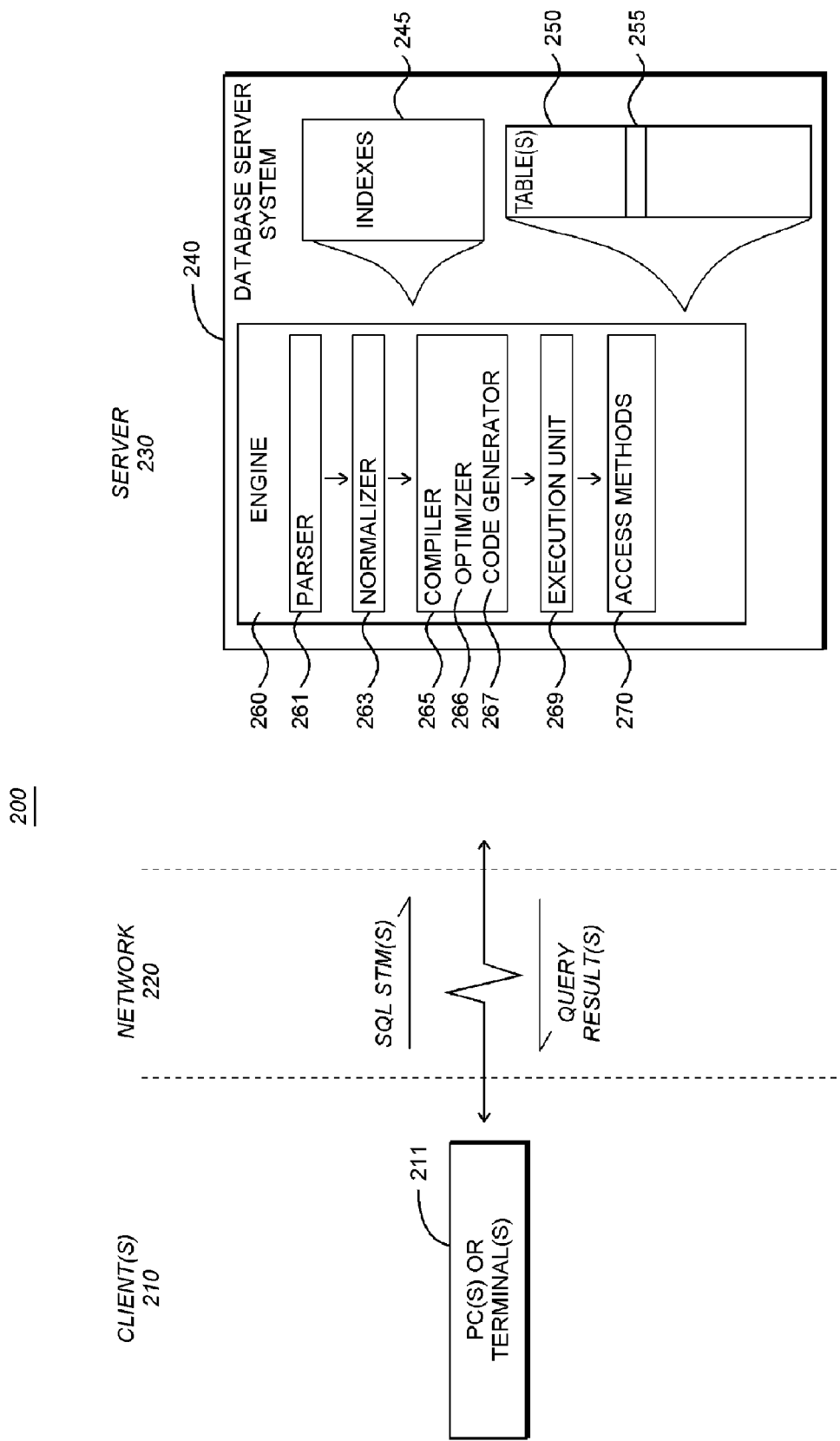
FIG. 2 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 240, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 12.5.1 Collection: (1) Core Documentation Set and (2) Installation and Configuration," available from Sybase, Inc. of Dublin, Calif. This product documentation is available via the Internet (e.g., currently at sybooks.sybase.com/as.html). The disclosures of the foregoing are hereby incorporated by reference.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250.

In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and an access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers or mobile devices). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of System and Methodology for Cross Platform Database Migration

Current database systems do not allow users to utilize physical backup mechanisms to migrate a database from a big-endian platform to a little-endian platform (or vice-versa). The present invention provides a solution to this problem. The present invention uses database archive files (e.g., database dump files) in their existing format and converts database device files to the target byte order on the target machine (e.g., during a database LOAD or similar operation on the target machine). The present invention, in its currently preferred embodiment, is implemented in a Sybase® Adaptive Server® Enterprise (ASE) database management system and provides for a user to perform a database migration using existing database commands (e.g., DUMP DATABASE and LOAD database commands) for dumping a database on the source (or old) platform and loading it on a target (or new) platform having a different byte storage architecture. Although the following discussion focuses on the currently preferred embodiment, which is implemented as part of a LOAD database operation on the target platform, the present invention may also be used for migrating a database from a source platform to a target platform in other circumstances. For example, the methodology of the present invention can be used in conjunction with database Unmount and Mount commands. Accordingly, the following description of conversion during a LOAD database operation is for purposes of illustrating the operations of the present invention and not for purposes of limitation.

By way of introduction, a database includes two general types of data: user data and system data. The system data includes data in system tables of the database as well as other system control data. The structure of the user data is described in the system data. The content of a "physical" database device file includes some rather complicated formats and structures. For example, some system data is described in other system data, and so forth. The general approach of the present invention is to start with a minimum base of known or discoverable facts in the content of the physical database device file (e.g., loaded from database dump file from the source platform) and build translation dictionaries for the conversion of the database to the format of the target platform. This conversion (which is also sometimes referred to herein as "translation" or "unscrambling") is performed in two general phases. In the first phase, the system data is converted (translated) to the appropriate format for the target platform. In the second phase the system data is used for converting the user data. A two phase approach is needed because the user objects (user tables) cannot be directly converted as the user objects are described in the system objects (system tables or catalogs). Thus, the system objects are translated first and used for translating the user objects.

Figure 3:
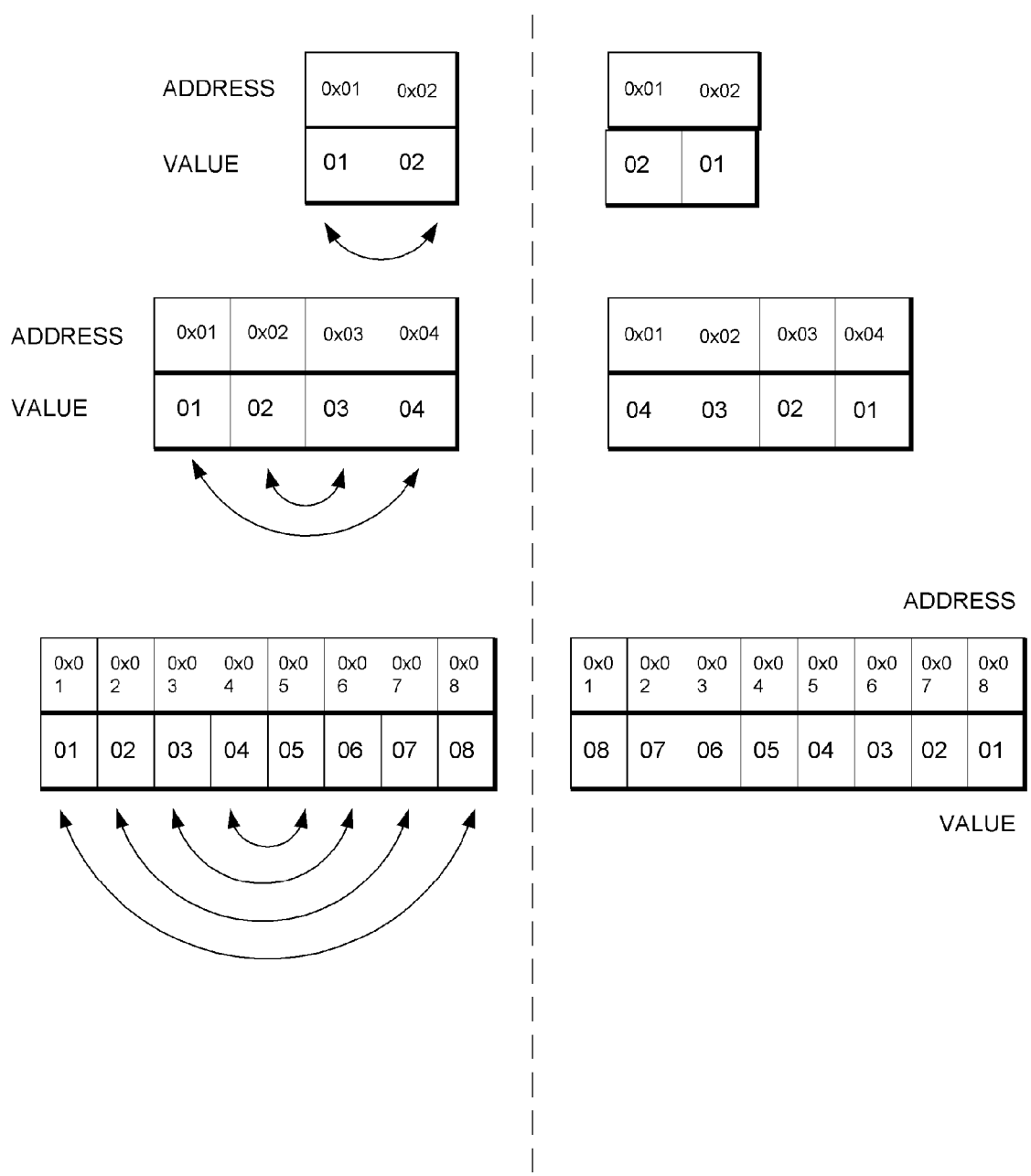
FIG. 3 is a block diagram illustrating data conversion using a byte swap method.

During this two-phase conversion process, each data field/item that needs to be translated to the byte organization (byte order) of the target platform is converted using a byte swap method. This byte swap method is used to convert (translate) integer and float-based datatypes. FIG. 3 is a block diagram illustrating conversion of 2 byte, 4 byte, and 8 byte data using a byte swap method. For a 4 byte integer, for example, the first and fourth bytes and the second and third bytes are swapped as shown at FIG. 3. It should be noted that no conversion is performed (or necessary) for many other data types. For instance, if a field/column contains character data, no conversion needs to be performed. Accordingly, before performing the translation, the system of the present identifies those portions of the database which need to be translated.

In the currently preferred embodiment of the present invention, the conversion of the database is performed during a LOAD DATABASE operation on the target platform. One of the advantages of this approach is that it is easy to support loading a database from older version of the database system to a new version as no change is necessary in the older version of the database system. From a user standpoint, no syntax change to the LOAD DATABASE command is necessary. The database system detects the endianness (endian type) of the database device file (e.g., database dump file) automatically during the LOAD DATABASE operation. The system then converts the database to the byte-order of the target platform if the database device file was generated on another type of platform (e.g., a cross-platform conversion from big-endian to little-endian or vice versa is involved).

The translation starts with the DBINFO, which is one of the more important structures in the database. The DBINFO exists at a fixed location in the database, which is referred to as page 24. That page is read first to obtain some information about the database, including the server version that created the database, and the byte ordering (e.g., big-endian or little-endian) which that server uses (i.e., the endian type of the source platform). If the endian type of the source platform and the target platform are the same, then no transformation/conversion is needed and the database is already restored to the database device file from the database dump file. However, if the two platforms have different endian types, the methodology of the present invention converts the database to the format for the target platform in two general phases.

In the first phase of the conversion process the physical layout and system catalogs are converted. Initially, a translation dictionary for system objects is built. This translation dictionary includes system tables and their indexes, and the complex objects within special page types such as allocation pages, OAM pages, or slice control pages. The translation dictionary is built for both data row and index row of the system tables as described below in more detail. Currently, this translation dictionary is built from a systable global system table. This is a pre-defined (fixed) structure encoded in the database management system binary which represents the schema of the system tables of the DBMS. From this pre-defined structure, the columns, fields, and data types of the system tables are determined and used to build the translation dictionary for the system tables. For translation of index rows, the index key definition is in the SYSINDEXES system tables. The DBMS also has global definitions for the index; however, it is usually only for the latest version of the format. Thus, it is necessary to actually look up the index key definition from disk and build the translation dictionary for indexes from the on-disk structure (SYSINDEXES). The translation dictionary is similar to the regular database schema, but it differs in that it describes the translation type rather than the actual data type. For example, an integer and a float need the same translation method (i.e., the 2 byte, 4 byte, and 8 byte swap methods as previously described). The translation dictionary describes the particular translation (e.g., 4 byte swap) that needs to be made to particular data and not all the characteristics of the database. A column containing character data, for instance, is not included in (i.e., excluded from) the translation dictionary as this character data does not need to be translated.

After this translation dictionary is constructed, the system then proceeds to perform the conversion of the system objects (system tables) by allocation unit. A database typically has a number of pages, with each page representing a physical block of the database file. Each data page has a page header and a page footer (or offset table) which contain system control data. This system control data (or page physical format data) is converted in the first phase. The allocation page and the page physical format of three system tables (SYSOBJECTS, SYSINDEXES and SYSCOLUMNS) which are used to describe user objects are also translated in the first phase. The conversion of these three tables is performed at this point so that they can be used later in phase two for converting the user objects. For each allocation unit, the allocation page is converted and that allocation page is used to discover which other pages are used in that allocation unit. Each page is read in turn, in page number order, unscrambling (translating) the header to determine what kind (type) of page it is. Using the knowledge of page type, any other parts of the page that represent system data, such as the page offset table, extended page header, or OAMSTRUCTs are translated. The OAM (object allocation map) page is another structure including system data which is translated in this phase. Also, column data in the columns of the system table are also converted. This includes in-row data and index row overhead data such as row length, DOL row headers and offset tables, and index row page and RID pointers. Doing this work at this point in the process makes it possible in later passes to use standard row accessor functions. If the current page represents a system object (data or index), the page's data rows are translated using the previously defined translation dictionaries describing their data.

After translation of system data in all allocation units has been completed, the conversion of user objects proceeds. In this second phase, the translated system data is used to build a translation dictionary for conversion of the user objects (user tables). The translation dictionary for user tables is built by scanning the SYSOBJECTS, SYSINDEXES, and SYSCOLUMNS system tables which were translated in phase 1. The translation dictionary is built for translatable columns and indexes of each user object. After building the translation dictionary, the actual translation of user objects is performed working page-by-page. This second phase converts the physical layout of each page and column/index data of all user tables and system tables other than those which were previously translated (i.e., SYSOBJECTS, SYSINDEXES, and SYSCOLUMNS). In this translation process, the actual byte-swap operations are performed for converting the portions/fields of the database that need to be converted. As previously noted, some portions (e.g., character data) may not need to be converted. The portions requiring conversion include not only float and integer (int) datatypes, but also some other more complex datatypes which are based on these primitive datatypes. Large I/O (read and write one allocation unit) is used in this phase for performance reasons; however, using large I/O is not necessary for implementation of the present invention. When the above phases have been completed, the translation (conversion) process is complete.

System Components

Figure 4:
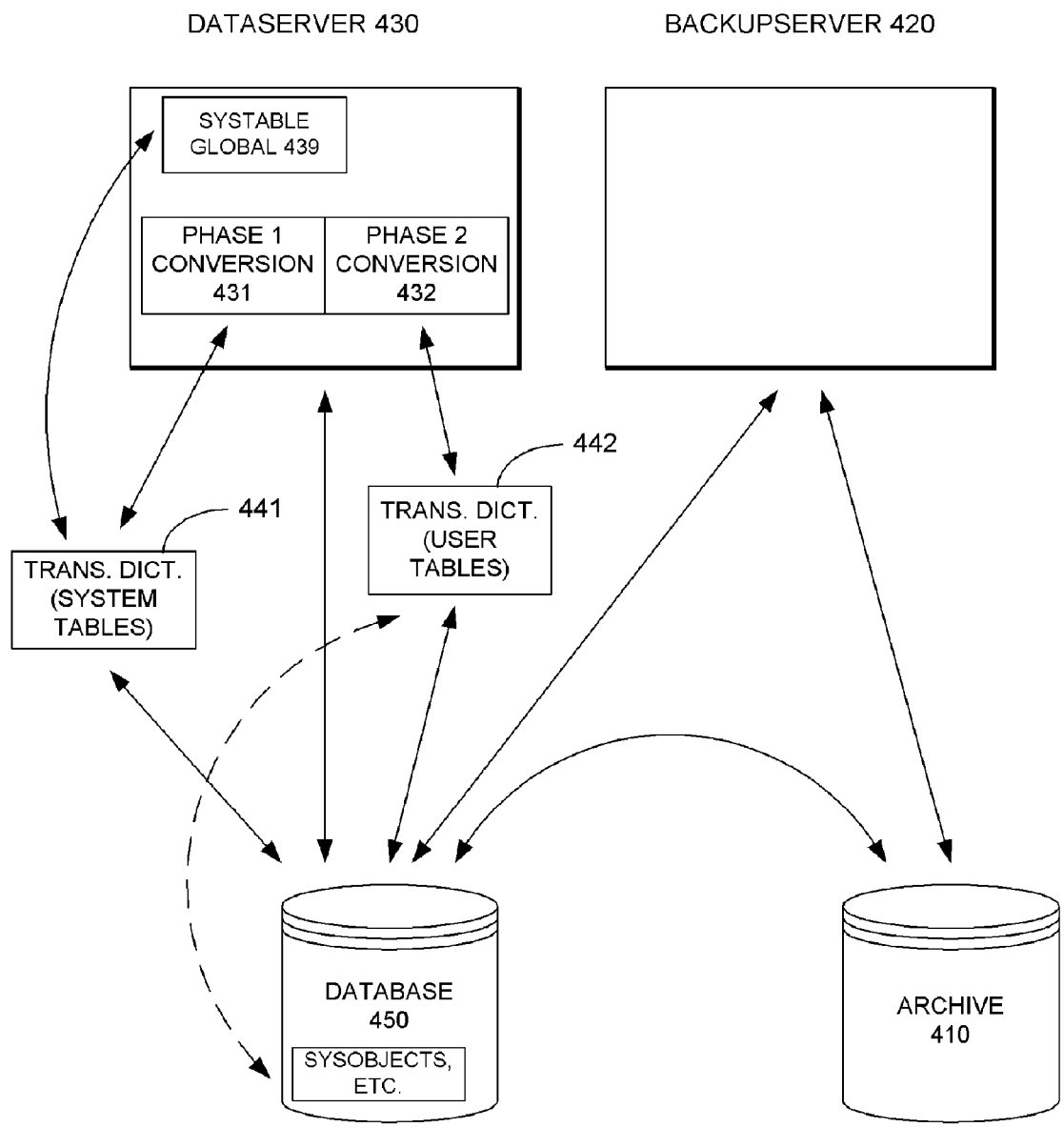
FIG. 4 is a high-level block diagram of an environment in which the present invention may be implemented.

In the currently preferred embodiment of the present invention, core cross-platform conversion methodology of the present invention is implemented in two processes (or modules) of the database management system: a dataserver process and a backupserver process. FIG. 4 is a high-level block diagram of an environment 400 in which the present invention may be implemented. As shown, the environment 400 includes an archive 410, a backupserver process (module) 420, a dataserver process (module) 430, and a (target) database 450. The archive 410 represents the source database which may be stored on various types of physical media or devices (e.g., tape or hard disk). The dataserver 430 and backupserver 420 are processes of a database management system which runs on a target machine (not separately shown). The phase 1 conversion module 431 and phase 2 conversion module 432 implement methodology of the present invention for building translation dictionaries (e.g., translation dictionaries 441, 442 as shown at FIG. 3) and converting the database device file from its existing format to the target byte-order on the target machine. The database 450 represents the database on the target machine. The following illustrates at a high level the typical flow of operations among the backupserver and dataserver modules during a cross-platform database load operation in the currently preferred embodiment of the present invention.

Environment 400 includes two devices: a database device (on the target platform) and an archive device. The archive device can be a tape, a hard disk, or the like. There are also two processes (or modules) running on the target platform: the dataserver 430 and the backupserver 420. As shown, the dataserver 430 accesses the database 450, while the backupserver 420 accesses both the archive 410 and the database 450. When invoked in response to a LOAD DATABASE command received by the dataserver 430, the backupserver 420 detects the endian type of the dump file from the backupserver dump header and performs necessary unscrambling of backupserver's dump header. The dataserver 430 detects the dump file's endianness from the ASE dump header and performs necessary translation of the ASE dump header. The backupserver 420 then performs necessary translation of the runlist and restores database pages from the archive device to database device. Note that the backupserver 420 simply restores the database from the archive 410 without translating/converting pages of the database.

After the database pages have been restored on the target machine, the phase 1 conversion module 431 and phase 2 conversion module 432 of the dataserver 430 are invoked to convert the database 450 to the byte order required for the target platform. As previously described, the translation is performed in two phases. Before the actual conversion (translation) is performed in each phase, translation dictionaries are built for performing the conversion. The phase 1 conversion module 431 builds a translation dictionary for the system tables. As shown, a systable global 439 is initially consulted for building the translation dictionary 441 for the system tables. After this translation dictionary 441 has been built, it is used by the phase 1 conversion module 431 for conversion of the system tables (objects). In phase 2, the translated system tables are used to build the translation dictionary for user objects (tables). As shown at FIG. 4, the phase 2 conversion module 432 builds a user table translation dictionary 442 using the system objects converted in phase 1. More particularly, the user objects translation dictionary 442 is created based on three system tables (SYSOBJECTS, SYSINDEXES, SYSCOLUMNS) as hereinafter described. After building the translation dictionary 442, the phase 2 conversion module 432 translates the user tables (objects) using this translation dictionary. This two phase conversion process is described below in greater detail.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

The following discussion describes the currently preferred embodiment of the present invention in which the methodology of the present invention for migration of a database from a source platform to a target platform having a different endian type is implemented as part of a LOAD database operation on the target platform. However, the present invention may also be used for converting a database to the required format of the target platform in other circumstances For example, it also can be used in conjunction with other physical data migration mechanisms (e.g., Unmount and Mount commands). Accordingly, the following discussion which describes performing the conversion during a LOAD database operation is for purposes of illustrating the operations of the present invention and not for purposes of limitation.

Methodology for Conversion of Database on Target Platform

Figure 5A:
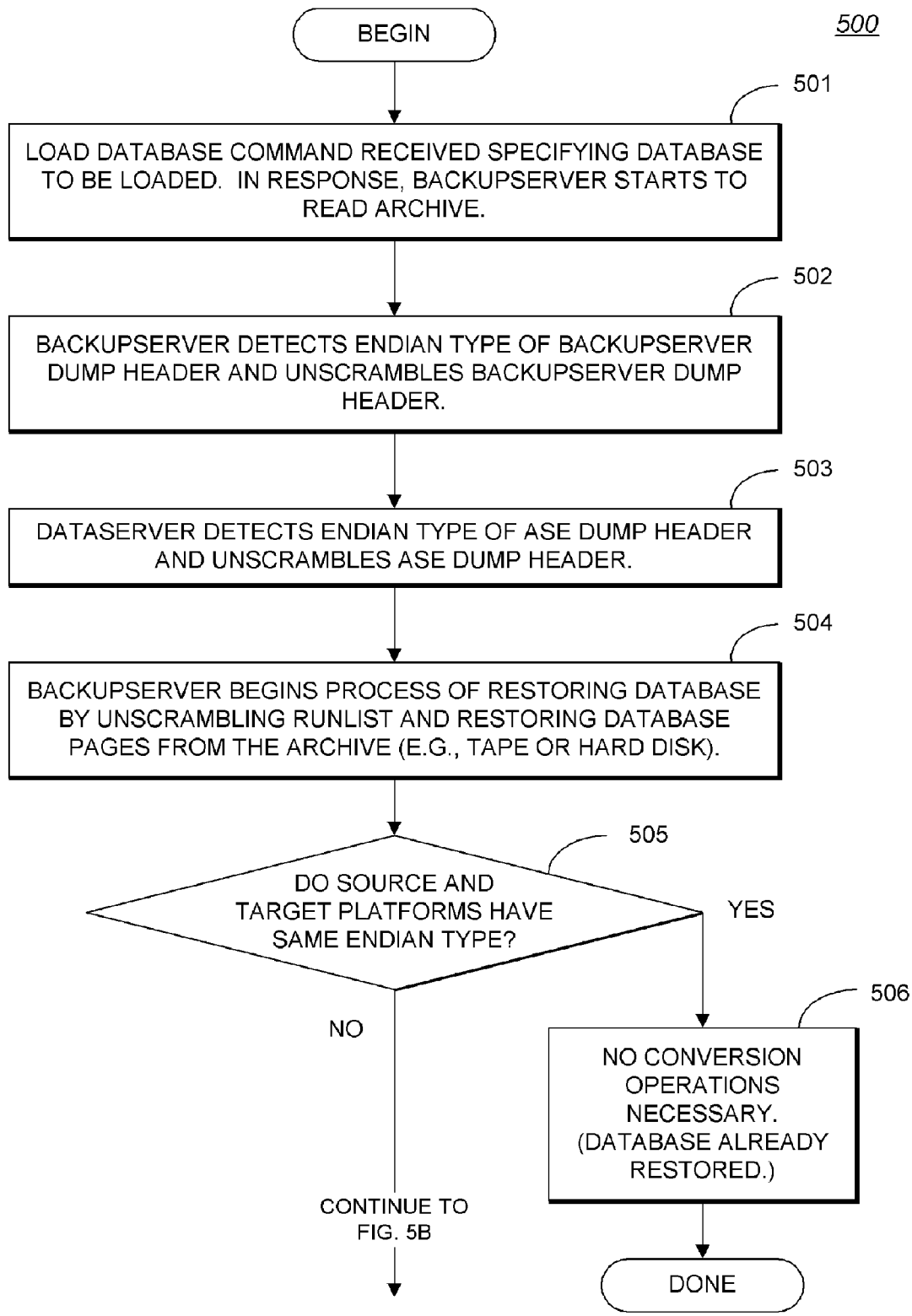
FIGS. 5A-B comprise a single flowchart illustrating the high level method of operation of the present invention for migration of a database from a source platform to a target platform having a different endian type.
Figure 5B:
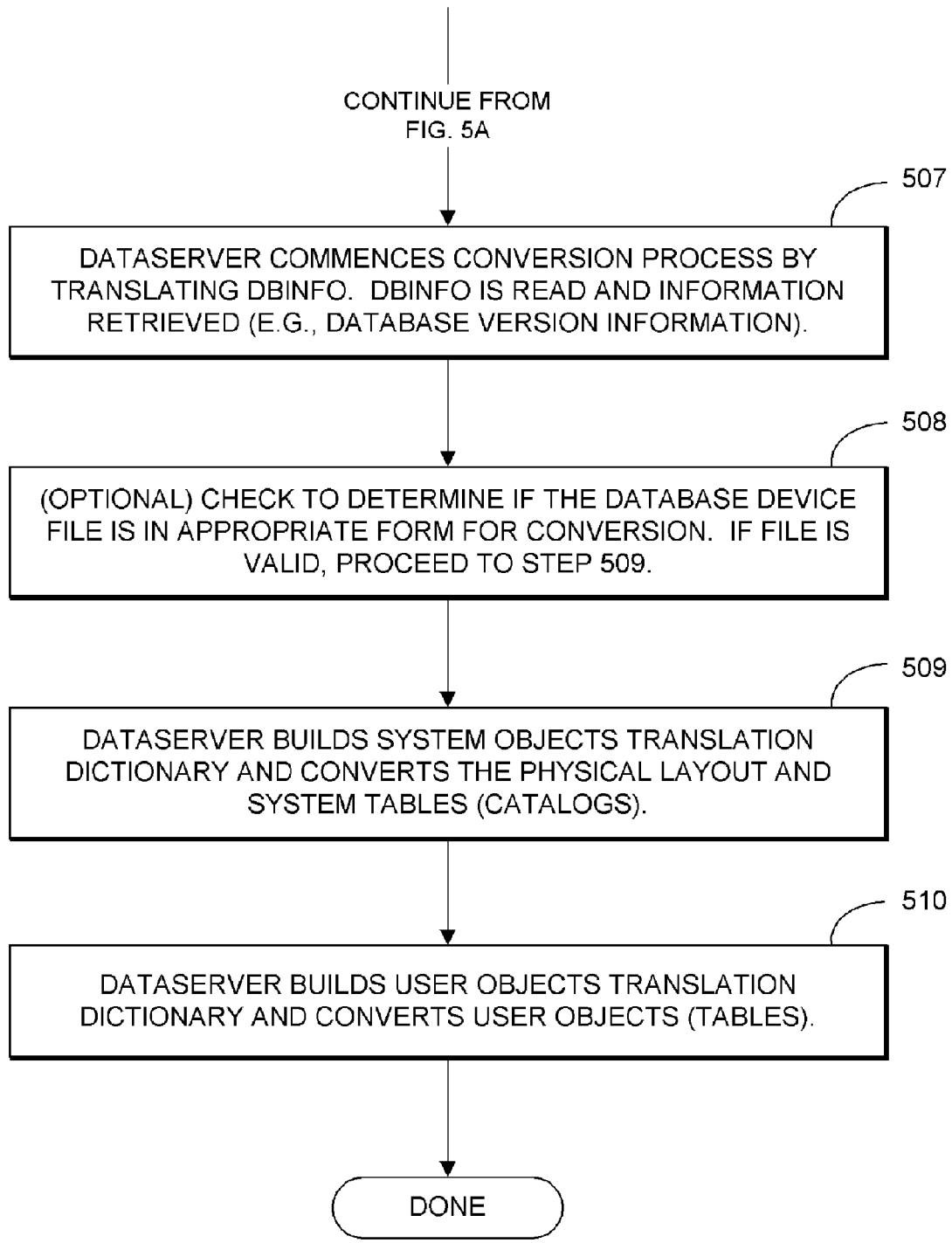

FIGS. 5A-B comprise a single flowchart 500 illustrating the high level methods of operation of the present invention for migration of a database from a source platform to a target platform having a different endian type. As shown, the process begins at step 501 with the receipt of a LOAD DATABASE command at the dataserver process. The LOAD DATABASE command specifies the name of the database that is to be loaded. In response, the dataserver invokes the backupserver process (e.g., by interprocess communication), which starts to read the archive device file. At step 502, the backupserver detects the endian type of the backupserver dump header and unscrambles the backupserver dump header. Note that in the currently preferred embodiment of the present invention there are two different dump headers: a backupserver dump header and an ASE dump header. At step 503, the dataserver detects the ASE dump header's endian type and unscrambles the ASE dump header.

At step 504, the backupserver begins the process of restoring the database by unscrambling the runlist and restoring database pages from the archive (e.g., tape, hard disk, or the like). At step 505, a determination is made as to whether the endian type of the source platform and the target platform are the same. If they are the same, no translation (conversion) operations are necessary as shown at 506. In this case, the process terminates as the database has already been restored at step 504. Otherwise, if the endian type of the source and target platforms are different, the system proceeds to step 507 to commence the translation (conversion) process.

At step 507, the dataserver commences the conversion process by translating (unscrambling) the DBINFO. The DBINFO is read and important information, such as database version information, is retrieved from DBINFO. Optionally, a check is made to determine if the database device file is in appropriate form for performing the conversion at step 508. The dump file may not be valid, for instance, if the database was being updated concurrently with the dump file being generated. If the file is valid, the method proceeds to step 509 for the first phase of the conversion process. At step 509, the dataserver builds the system objects translation dictionary and translates (converts) the physical layout and system tables (catalogs) as hereinafter described in more detail and illustrated at FIG. 6. After this phase is complete, the second phase of the conversion process commences. At step 510, the dataserver builds the user objects translation dictionary and translates (converts) the user objects (tables) as described below and illustrated at FIG. 7.

Conversion of Physical Layout and System Tables (Phase 1)

Figure 6:
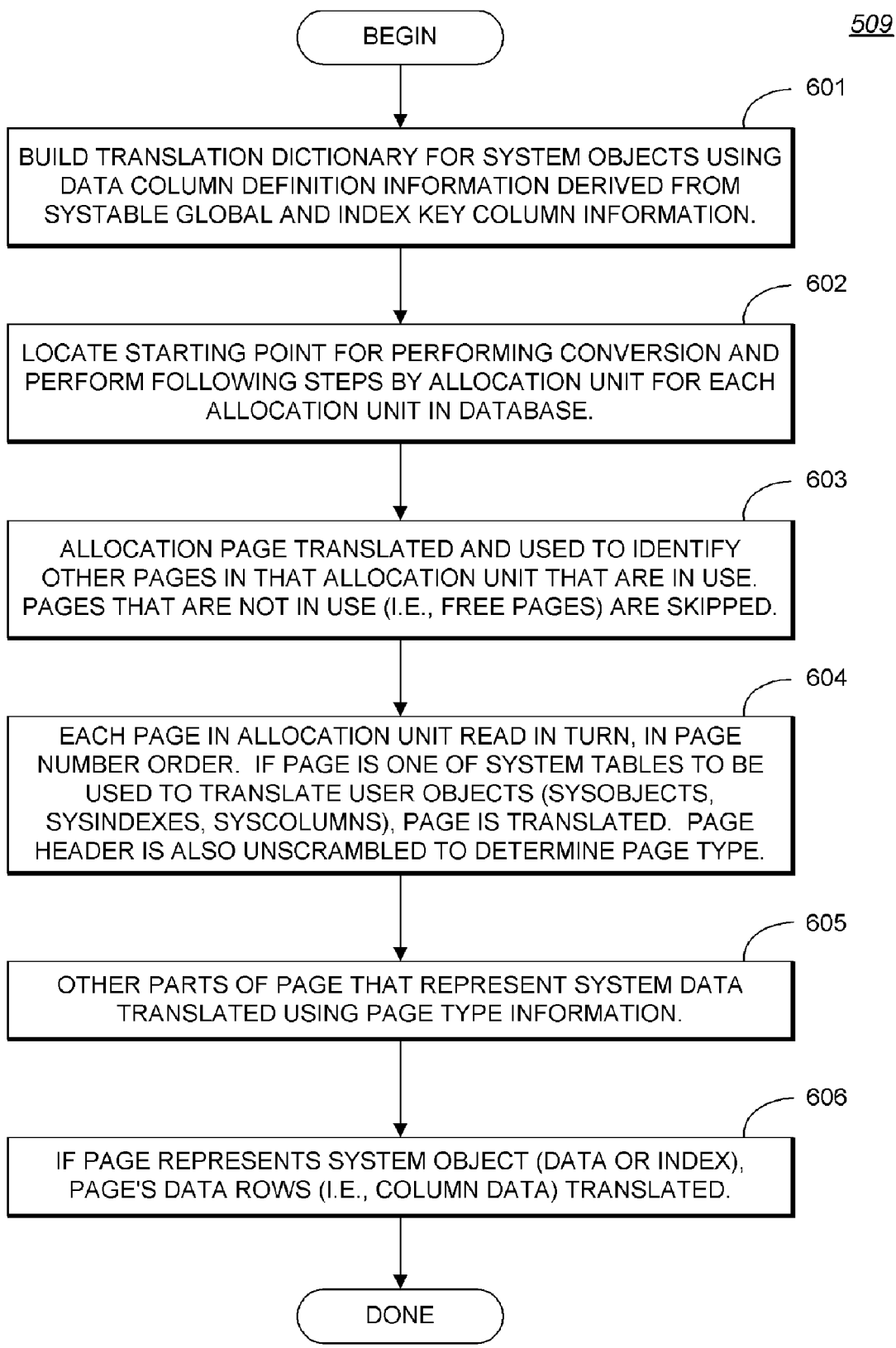
FIG. 6 is a flowchart which illustrates the conversion of the physical layout and system tables (catalogs) in further detail.

FIG. 6 is a flowchart 509 (corresponding to step 509 of FIGS. 5A-B) which illustrates the conversion of the physical layout and system tables (catalogs) in further detail. At step 601, a translation dictionary for system objects is built using data column definition information derived from the systable global and index key column information from disk. This translation dictionary includes system tables and their indexes, and the complex objects within special page types such as allocation pages, OAM pages, and slice control pages. At 602, a starting point for performing the conversion is located. In the currently preferred embodiment of the present invention, the starting point is simply allocation (alloc) page 0. However, the starting point could alternatively be an allocation page noted in the DBINFO (or in some other fashion). The following steps are then performed by allocation unit for each allocation unit in the database. An allocation unit is a unit of 256 pages, with an allocation page as the first page of each allocation unit. The allocation page lists allocated and free (unallocated) pages in an allocation unit.

At step 603, the allocation page is translated and is used to identify other pages in that allocation unit that are in use. Pages in the allocation unit that are not in use (i.e., free pages) are skipped. At step 604, each page in the allocation unit is read, in turn, in page number order. If the page is one of the system tables which will be used to translate user objects (SYSOBJECTS, SYSINDEXES, SYSCOLUMNS), then the page is translated. The page header is also unscrambled to determine what type of page it is. At step 605, any other parts of the page that represent system data are translated using the page type information determined at step 604. This system data may include the page offset table (or page footer), an extended page header, or OAM-STRUCTs (from Object Allocation Map or OAM). This includes both in-row data and index row overhead (or system control) data such as row length, DOL row headers and offset tables, and index row page and RID pointers. Doing this translation of this system control data at this point makes it possible in later passes to use standard row accessor functions. At step 606, if the page represents a system object (data or index), the page's data rows (i.e., actual column data) are translated. This translation can be performed at this point because the translation dictionaries describing the data have previously been built. The above steps 603 to 606 are repeated for each allocation unit in the database.

Conversion of User Tables (Phase 2)

Figure 7:
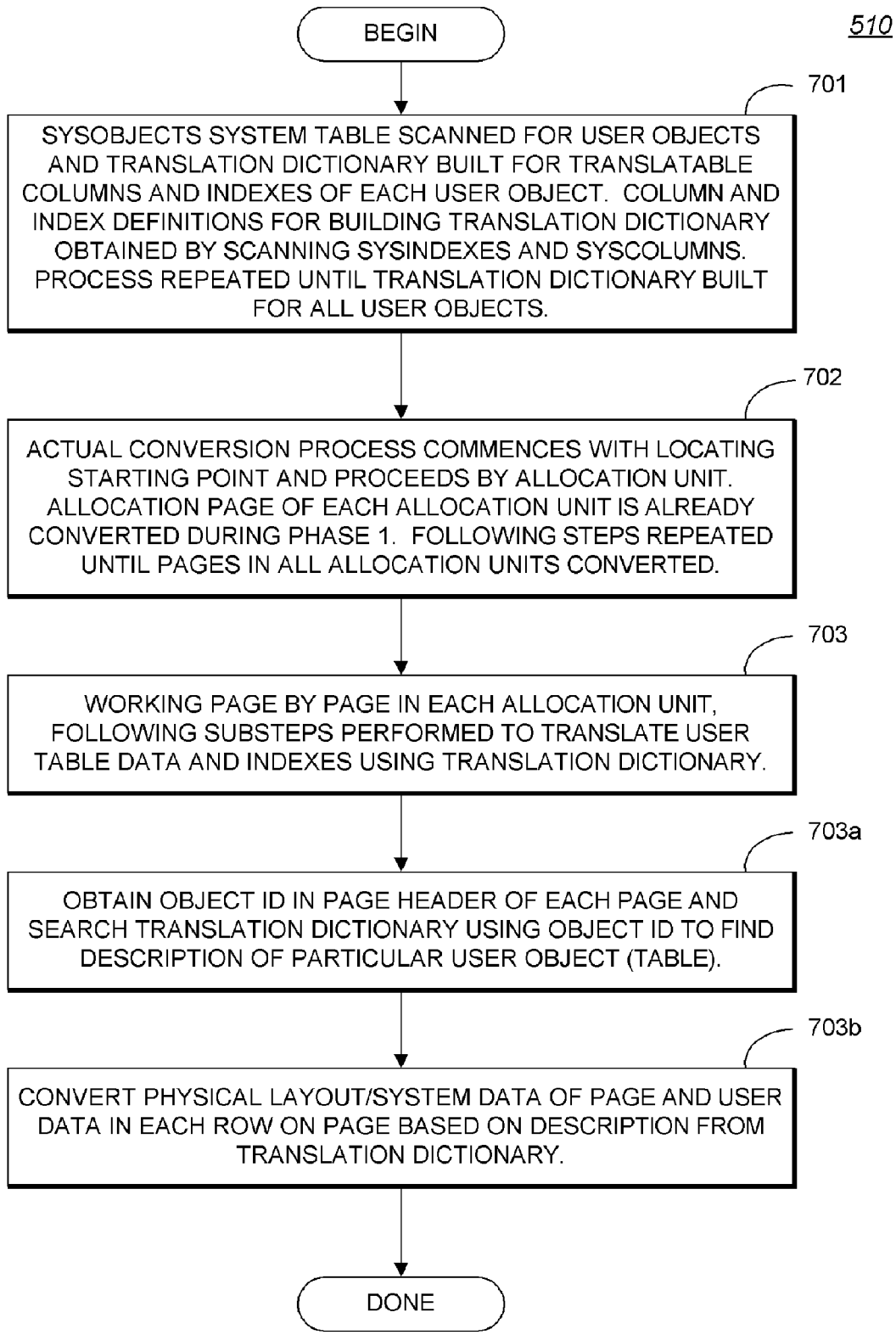
FIG. 7 is a flowchart which illustrates the conversion of the user tables (objects) in further detail.

FIG. 7 is a flowchart 510 (corresponding to step 510 of FIGS. 5A-B) which illustrates the conversion of the user tables (objects) in further detail. The conversion of user objects is performed after the necessary system tables that describe these user objects have been translated. At step 701, the SYSOBJECTS systems table is scanned for user objects and a translation dictionary is built for translatable columns and indexes of each user object. The column definition and index definitions for building the translation dictionary are obtained by scanning SYSINDEXES and SYSCOLUMNS. This process is repeated for each of the user objects until a translation dictionary has been built for all user objects.

After building translation dictionaries for all user objects, the actual conversion process itself commences. The conversion of user objects is similar to the conversion of system objects in phase 1 and commences with locating a starting point at step 702. In the currently preferred embodiment, the starting point is simply allocation page 0. The work proceeds by allocation unit, with the following operations performed for each allocation unit in the database. The allocation page of each allocation unit is already unscrambled during the above-described phase 1 operations. Working page by page in each allocation unit, the user table data and indexes on the pages in the allocation unit are translated using the translation dictionary at step 703. This translation work includes two substeps. At substep 703a, the object id in the page header in each page is obtained and the translation dictionary is searched using this object id to find a description of the particular user object (table). At substep 703b, the physical layout/system data of each page and the user data in each row on the page are then converted based on the information obtained from the translation dictionary. This process is repeated until the pages in all allocation units have been converted.

Translation Dictionaries

Translation dictionaries serve as schema for cross platform conversion and are used to convert (translate) various data in the database. A translation dictionary describes translation type/offset of columns in a table (e.g., system table or user table) or field in a structure on disk. The dictionary exists only for a column/field which needs translation (i.e., integer/integer based type/float only). Definitions of contiguous fields/columns are combined in the dictionary if their translation type is same. The structure of the translation dictionaries is described below.

The following XPD_SYSCOL structure is used to describe or define each column (or field) of a table, such as a system table, complex system control data, or a user table:

```
 1: /*
 2: ** XPD_SYSCOL
 3: **
 4: ** Translation dictionary for column definitions
 5: ** in system catalog, complex system control data and user table on disk.
 6: */
 7: typedef struct xpd_syscol
 8: {
 9:    int dictoffset; /* Array offset (array element number) */
10:        /* of extended-type dictionary */
11:        /* in Xpd_systables, if any. */
12:        /* Used only for extended types. */
13:    BYTE transtype; /* Translation type, or an indicator for */
14:        /* "extended type". */
15:    BYTE itercount; /* How many times this element(or extended */
16:        /* type) repeats */
17:    short coloffset; /* Offset of column */
18:    uint16 collen; /* (max) length of one element. */
19:        /* if extended type, total size in bytes for */
20:        /* one extended type(not a number of elements)*/
21:    colid_t colid; /* Column ID */
22: } XPD_SYSCOL;
23:
24: /* Translation type definition */
25: #define SWAP_MSB_I2      1 /* Byte swap 2 byte integer */
26: #define SWAP_MSB_I4      2 /* Byte swap 4 byte integer */
27: #define SWAP_MSB_I8      3 /* Byte swap 8 byte integer */
28: #define TRANS_SARG       4 /* Translate modern SARG */
29: #define TRANS_TXTPTR     5 /* Translate text pointer */
30: #define TRANS_SARG_V0    6 /* Translate old SARG */
31: #define TRANS_OBJVTS     7 /* Translate OBJVTS structure */
32: #define TRANS_XACTKEY    8 /* Translate XACTKEY */
33: #define TRANS_XACTID     9 /* Translate XACTID */
34: #define TRANS_UNICHAR    10 /* Translate unichar data */
35:
36: #define EXT_TYPE 0xcd /* Extended type */
37:     /* 0xcd is GRANT token. OK to use. */
```

The dictoffset field is applicable to an extended type dictionary and used only for "extended" types. An extended type involves a structure that is nested inside another structure. The dictoffset field represents an array offset (array element number) in an XPD_SYSTABLES table, to an XPD_INDDEF array, used for processing extended types. The transtype field is an indicator for the column's translation type or an indicator for an extended type. The translation types include the 2 byte, 4 byte, and 8 byte primitive translation types as shown at lines 25-27. Several special types are also shown at lines 28-34. These special types are used to indicate some special conversion handling that may be needed for particular structures of the database system.

The itercount field indicates how many times this element (or extended type) is repeated (minimum 1). The coloffset field provides the offset of the column and the collen provides the (maximum) length of one element of the column. The coloffset is the starting offset (in the row, on the page, or in the structure) to which this element refers; whether it is a row or page offset can only be known in context, except that negative offsets refer to varying-length column identifiers that are always in-row. The collen is the (maximum) size in bytes of one element. For extended types, collen represents the total size in bytes of one element for the extended type in the array pointed to by dictoffset. The collen may be multiples of column size, to accommodate arrays as discussed below. The colid field represents the column id and is used by in-row column descriptions.

The following XPD_INDDEF structure illustrates the structure of the translation dictionary for index definitions of an index in a system table or user table:

```
 1: /*
 2: ** XPD_INDDEF
 3: **
 4: ** Translation dictionary for index definitions in a system table/
 5: ** user table, or for extended type definitions in system control data.
 6: ** This structure is array.
 7: */
 8: typedef struct xpd_inddef
 9: {
10:    int column_list; /* Byte offset to list of index columns. */
11:       /* For extended type, array offset */
12:       /* (array element number) of extended-type */
13:       /* dictionary in Xpd_systables. */
14:    uint16 column_count; /* number of entries in columns list */
15:    indid_t index_id; /* this index's index ID */
16: } XPD_INDDEF;
```

The column_list field shown above at line 10 is a byte offset to a list of index key columns. The column_count field at line 14 indicates the number of entries in the column list. The index_id field represents the index id of a given index.

The below XPD_SYSTABLE structure is a virtual SYSTABLE describing a complex data structure, system table or user table:

```
 1: /*
 2: ** XPD_SYSTABLE
 3: **
 4: ** Translation dictionary for system table definitions
 5: ** for system catalog, complex system control data and user table on disk.
 6: */
 7: typedef struct xpd_systable
 8: {
 9:    XPD_SYSCOL *table; /* Ptr to XPD_SYSCOL array */
10:    int32 table_size; /* # of element in XPD_SYSCOL array */
11:    XPD_INDDEF *indexes; /* Ptr to XPD_INDDEF array */
12:    int32 ind_howmany; /* # of element in XPD_INDDEF array */
13:    objid_t objid; /* Object id for this table */
14: } XPD_SYSTABLE;
```

As shown above at line 9, *table is a pointer to an XPD_SYSCOL array having an entry for each column of the table that needs to be translated. The table_size field indicates the number of columns in this table. At line 11, *indexes is a pointer to an XPD_INDDEF array for indexes that are to be translated. The ind_howmany field indicates how many elements are in the XPD_INDDEF array. If one table has a number of indexes, for example, this field may indicate that there are a number of entries in the XPD_INDEF array. The objectid field represents the object id of the table.

Dataserver Modules and Operations

The following pseudocode illustrates the main function (lddb_unscramble) implementing the cross platform conversion methodology of the present invention:

```
27: void
28: lddb_unscramble(DMPLDCTX *dump, DBTABLE *dbt)
29: {
30:     /*
31:     ** Prepare and start cross platform database conversion.
32:     **
33:     ** Examine page 24, detect the database's endianness,
34:     ** unscramble DBINFO.
35:     */
36:
37:     /* Read page 24, ie. first page of sysindexes. */
38:
39:     /* Check if we get a scrambled page number. */
40:     if (SWAPLONG(&(bp->bpage->dp.ppageno)) != PG_IND)
41:     {
42:         /*
43:         ** Page number is not scrambled.
44:         ** Unscramble is not needed.
45:         ** This is same architecture load database.
46:         */
47:         return;
48:     }
49:
```

-continued

```
 50:   /*
 51:   ** Page number of page 24 is scrambled.
 52:   ** We need to unscramble the database.
 53:   */
 54:
 55:   /* Alloacate / initialize XPDCTX structure */
 56:
 57:   /* On that page, locate the Sysindexes row with dbinfo. */
 58:
 59:   /*
 60:   ** Read the DBINFO.
 61:   ** Use DBINFO.dbi_version and DBINFO.dbi_upgdvers
 62:   ** to tell us the DBINFO's version, which tell us the db's
 63:   ** source version.
 64:   */
 65:
 66:   dbinfop = (DBINFO *)((INDEX_ONDISK *) rowp)->indkey;
 67:
 68:   if (xpdctxp->upgdvers >= V12_0_0_UPGDVERS_ID)
 69:   {
 70:      /* DBINFO size increased from 12.0 */
 71:      xpd_systabp = GET_XPD_SYSTABLE_PTR(SYS_DBINFO, xpdctxp);
 72:      dbinfo_size = sizeof(DBINFO);
 73:   }
 74:   else
 75:   {
 76:      /* DBINFO size was small on pre-12.0 */
 77:      xpd_systabp = GET_XPD_SYSTABLE_PTR(SYS_DBINFO_V119,
 78:         xpdctxp);
 79:      dbinfo_size = sizeof(HAS_DBISIZE_DBINFO);
 80:   }
 81:
 82:   /* Do translation for the DBINFO */
 83:   lddb___translate(xpdctxp, xpd_systabp->table,
 84:      xpd_systabp->table_size,
 85:      (BYTE *)dbinfop, (int)UNUSED, (int)UNUSED, (int)UNUSED,
 86:      (BYTE *)bp->bpage);
 87:
 88:   /* Unscramble physical format of this page. */
 89:   lddb___unscr_phys_page(xpdctxp, (ANYPAGE *)bp->bpage,
 90:      CONV_PHYS, xpdctxp->pgsize);
 91:
 92:   /* Flush the dbinfo to disk */
 93:
 94:   /*
 95:   ** Perform preliminary check for syslogs before conversion starts,
 96:   ** whether the database was dumped in a quiescent state.
 97:   */
 98:   if ((!lddb___unscr_check_log(xpdctxp, dump))
 99:   && (!TRACECMDLINE(LDDB, 77)))
100:   {
101:      ex_raise(LDDB, LDDB_INVALID_LOG, EX_USER, 1);
102:   }
103:
104:   /* We are starting cross platform database load conversion */
105:
106:   /*
107:   ** Start unscramble.
108:   */
109:
110:   /*
111:   ** Start phase 1 : Unscramble system objects.
112:   **
113:   ** Build translation dictionary for all system tables.
114:   ** Translation dictionary for data rows is built from Systables global.
115:   ** Translation dictionary for index rows is built from key definition
116:   ** in SYSINDEXES rows on disk.
117:   ** Perform unscramble of physical layout of each page and column data
118:   ** of SYSOBJECTS, SYSINDEXES, SYSCOLUMNS, and allcation pages.
119:   */
120:
121:   lddb___unscr_phys(xpdctxp, dbt);
122:
123:   /*
124:   ** Start phase 2 : Unscramble user objects.
125:   **
```

```
126:    ** Build translation dictionary for all user tables.
127:    ** Translation dictionary for user tables is built from SYSOBJECTS,
128:    ** SYSINDEXES, SYSCOLUMNS which is just unscrambled in the phase 1.
129:    ** Perform unscramble of physical layout of each page and column data of
130:    ** all user tables and other system tables than SYSOBJECTS, SYSINDEXES,
131:    ** SYSCOLUMNS.
132:    */
133:
134:    if (!lddb___unscr_usro(xpdctxp, dbt))
135:    {
136:       goto finish_unscr;
137:    }
138:
139:    /*
140:    ** Start phase 3 : Unscramble syslogs.
141:    **
142:    ** Perform unscramble of log records.
143:    ** Examine log records which exists after the last checkpoint record
144:    ** whether it is a valid log record for cross platform load,
145:    ** ie. whether the database was dumped in a quiescent state.
146:    */
147:
148:    lddb___unscr_log(xpdctxp, dbt, syslogspgno);
149:
150: finish_unscr:
151:
152:    /*
153:    ** Finished unscramble processing.
154:    */
155:
156:    /* Release memory for system tables' translation dictionary */
157:
158:    /* Release memory for XPDCTX structure */
159:
160:    /* We are finishing cross platform database load conversion */
161:
162:    return;
163: }
```

The above lddb_unscramble function is the main entry function for performing a cross-platform conversion. It is called by lddb_main after all database pages are restored by backupserver. The above function initially detects the endian type of the database. If the source database and target database have the same endian type, then no conversion is necessary and the method returns as shown at line 47. However, if a conversion is needed, the conversion process starts with translating DBINFO and retrieving information, such as database version information, from DBINFO.

At line 98, a check is made to determine if the dump file is in appropriate form for performing the conversion. The dump file may not be valid, for instance, if the database was being updated concurrently with the dump file being generated. Assuming that the dump file is valid, the first phase of the conversion process proceeds. As shown at line 121, an lddb___unscr_phys function is called to start phase 1 of the conversion. This lddb___unscr_phys function is described below in more detail. After phase 1 is complete, lddb___unscr_usro is called to start phase 2 of the conversion as shown at line 134. At line 148, the lddb_unscr_log function is called to unscramble the log records for (optional) phase 3. The unscrambling of log records is not essential to the present invention and, therefore, the following discussion will focus on phase 1 and phase 2 of the conversion process.

Phase 1 Conversion Routines

The following pseudocode illustrates the lddb_unscr_phys routine which drives phase 1 of the conversion:

```
188: STATIC void
189: lddb___unscr_phys(XPDCTX *xpdctx, DBTABLE * dbt)
190: {
191:    /*
192:    ** Build a translation dictionary for system catalogs.
193:    */
194:
195:    /* Allocate memory for translation dictionary */
196:
197:    /* Allocate memory for translation dictionary buffers */
198:
199:    /* For each system catalog */
200:    for (sysobjid = SYSOBJECTS; sysobjid <= MINUSERTABLE; sysobjid++)
201:    {
202:       if (!(systblp[sysobjid].status & objtype))
203:       {
204:          /* Skip unused object IDs */
205:          continue;
206:       }
207:
208:       /*
209:       ** Build XPD_SYSCOL translation dictionary
210:       ** for this system table.
211:       */
212:       xpdsyscolp = lddb___build_transdic(xpdctx, sysobjid, xpdsyscolp);
213:    }
214:
215:    /*
216:    ** Build XPD_SYSCOL translation dictionary
```

```
217:    ** for indexes of all system tables by scanning Sysindexes.
218:    */
219:    lddb___build_transdic_ind(xpdctx, xpdsyscolp);
220:
221:    /* Let's unscramble page physical format and system objects */
222:
223:    lddb___unscr_phys_pages(xpdctx, dbt,
startpgno, endpgno, TRUE);
224:
225:    return;
226: }
```

The above lddb___unscr_phys routine allocates translation dictionary buffers and builds a translation dictionary for system tables. It unscrambles the physical layout of each page and column data of SYSOBJECTS, SYSINDEXES, SYSCOLUMNS, and allocation pages. As shown at lines 200-213, an XPD_SYSCOL translation dictionary is built for each system table (system catalog). More particularly, an lddb_build_transdic routine for building a translation dictionary is called with SYSTABLE global definition for the system table as shown at line 212. After the translation dictionary is built for all system tables, the index row translation dictionary for all system tables is built through the call to lddb_build_transdic_ind as shown at line 219. At line 223, the physical page format and system objects are unscrambled through a call to an lddb_unscr_phys_pages function. Each of these functions which are called are described below.

The lddb_build_transdic function for building a translation dictionary is as follows:

```
690: STATIC XPD_SYSCOL *
691: lddb___build_transdic(XPDCTX *xpdctx,
objid_t sysoid, XPD_SYSCOL *xpdsyscolp)
692: {
693:
694:    /*
695:    ** Build for column definitions
696:    */
697:
698:    /*
699:    ** For each syscol description in this system catalog,
700:    ** examine its datatype and build translation dictionary
701:    ** if translation is needed for the datatype.
702:    ** We want to traverse columns in column offset ascending order,
703:    ** so use syscol_iter( ).
704:    */
705:
706:    /*
707:    ** We use syscol_iter( ) instead of just repeating SYSCOL entries
708:    ** in the array, because we want in column offset order,
709:    ** so that we can combine column definitions.
710:    */
711:    while ((icol = syscol_iter(colp, tabsize, icol, &fixedlen)))
712:    {
713:        /* Build a XPD_SYSCOL for this SYSCOL. */
714:        cur_xpdcol = lddb___build_transdic_syscol(xpdctx,
715:            cur_xpdcol,
716:            &numxpdscol, typetransp, icol->scoloffset,
717:            icol->scoltype, icol->scolid, icol->scollen,
718:            sysoid, (int32)UNUSED, TRUE);
719:    }
720:
721:    if (numxpdscol != 0)
722:    {
723:        /* Build XPD_SYSTABLE translation dictionary. */
724:        xpd_systab_cata[sysoid].table = xpdsyscolp;
725:        xpd_systab_cata[sysoid].table_size = numxpdscol;
726:        xpd_systab_cata[sysoid].objid = sysoid;
727:
728:        /*
729:        ** Increment cur_xpdcol pointer for next use,
730:        ** because it points to the current entry.
731:        */
732:        cur_xpdcol++;
733:    }
734:
735:    /*
736:    ** Return xpd_syscol pointer for next use,
737:    ** it points to the next (new) entry.
738:    */
739:    return cur_xpdcol;
740: }
```

The above function is called for each system table to build a translation dictionary for that system table. The datatype of each syscol description (column definition) in the system catalog is examined and a translation dictionary is built if needed for the datatype. As shown at line 711, an iterator (syscol_iter( )) is called to get one column definition (syscol). A function for building the translation dictionary structure (XPD_SYSCOL) for that column definition is then called as provided at lines 714-718. This is repeated for all columns of the system table. Next, some fields are set up in the XPD_SYSTABLE translation dictionary as shown at lines 721-733.

The lddb___build_transdic_ind function for building a translation dictionary for an index is as follows:

```
762: STATIC void
763: lddb___build_transdic_ind(XPDCTX *xpdctx,
XPD_SYSCOL *xpdsyscolp)
764: {
765:    /*
766:    ** Translation dictionary for an index on a system table
767:    ** is created, when lddb___unscr_phys_page( ) which is called
768:    ** by lddb___unscr_apl( ) finds a row for a system table
769:    ** in Sysindexes by calling lddb___build_transdic_ind_row( ).
770:    ** As a side effect of this call to lddb___unscr_apl( ),
771:    ** Sysindexes system table is unscrambled.
772:    */
773:    lddb___unscr_apl(xpdctx,
xpdctx->xpd_systab_cata[SYSINDEXES].table,
774:        xpdctx->xpd_systab_cata[SYSINDEXES].table_size,
775:        xpdctx->sdes, xpdctx->scan_context, (pgid_t)PG_IND,
776:        (indid_t)CLUSTIND, TRUE);
777:
778:    /*
779:    ** We need to copy the last index translation dictionary
780:    ** from buffer.
781:    */
782:    (void)lddb___copy_transdic_ind(xpdctx,
xpdctx->cur_xpd_systab,
783:        (XPD_INDDEF *)xpdctx->cur_xpd_syscol);
784: }
```

The above function creates an XPD_SYSCOL translation dictionary for indexes of all system tables by scanning SYSINDEXES's data pages. Of particular interest, is the call to lddb_unscr_apl shown at lines 773-776. This lddb_unscr_apl function scans one system table's data pages from the first data page to the end of the table to get the index definitions. It scans SYSINDEXES by following next page pointer from the page 24 (first page of SYSINDEXES) and calls lddb___unscr_phys_page to unscramble each data page of SYSINDEXES. When lddb___unscr_phys_page finds a row for a system table in SYSINDEXES's data page, XPD_SYSCOL for the index on the system table is created in the call to lddb___build_transdic_ind_row. That is, as a side effect of this call to lddb___unscr_apl, the SYSINDEXES system table is unscrambled.

After the translation dictionaries have been built for the system tables as described above, the actual conversion is performed by the following lddb_unscr_phys_pages driver routine:

```
256: STATIC void
257: lddb___unscr_phys_pages(XPDCTX *xpdctx, DBTABLE * dbt, pgid_t startpgno,
258:     pgid_t endpgno, SYB_BOOLEAN in_phase1)
259: {
260:
261:     /* loop through every allocation pages that are used in this db */
262:         for (alpgno = startpgno; alpgno < endpgno; alpgno += PGS_IN_ALLOC)
263:     {
264:         /* Read this allocation unit or allocation page. */
265:
266:         if (in_phase1)
267:         {
268:             /*
269:             ** Object id (99) should be scrambled,
270:             ** because we have not yet unscrambled it.
271:             ** Restart scenario is not implemented yet.
272:             */
273:
274:             /* Unscramble this allocation page. */
275:             lddb___unscr_phys_page(xpdctx, (ANYPAGE *)allocpage,
276:                 CONV_BOTH, pgsize);
277:         }
278:
279:         /*
280:         ** Unscramble of this alloc page is done.
281:         ** Read each page in page number order in this alloc unit,
282:         ** and convert it.
283:         ** Convert only used pages in this alloc unit by using the
284:         ** alloc page.
285:         */
286:
287:         for (curext = 0; curext < EXTENTS_IN_ALLOC; pextent++, curext++)
288:         {
289:             if (EXTENT_IS_FREE(pextent))
290:             {
291:                 /* Skip free extents. */
292:                 targetpgno += PGIN_EXT;
293:                 continue;
294:             }
295:
296:             if ((!(IS_SYSCAT_XPLOAD_AVAIL(extobjid)))
297:             && (in_phase1))
298:             {
299:                 /*
300:                 ** We are in system objects conversion phase.
301:                 ** Do conversion for these 3 system tables only.
302:                 ** Skip this extent for user objects and other
303:                 ** system tables.
304:                 */
305:                 targetpgno += PGIN_EXT;
306:                 continue;
307:             }
308:
309:             if ((!in_phase1)
310:             && (IS_SYSCAT_XPLOAD_AVAIL(extobjid)))
311:             {
312:                 /*
313:                 ** We are in user objects conversion phase.
314:                 ** Do conversion only for user table pages and
315:                 ** system tables including Sysstatistics
316:                 ** except Sysobjects, Sysindexes, Syscolumns.
317:                 ** Skip this extent for these 3 system tables.
318:                 */
319:                 targetpgno += PGIN_EXT;
320:                 continue;
321:             }
322:
323:             /* Convert a page which is used. */
324:             for (mask = 1; mask != NITEMSI1;
325:                 mask = mask << 1, targetpgno++)
326:             {
327:                 if ((!(extalloc & mask))
328:                 || (targetpgno == alpgno))
329:                 {
330:                     /*
331:                     ** This page is not used,
332:                     ** or is allocation page which is
333:                     ** already unscrambled.
334:                     */
335:                     continue;
336:                 }
337:
338:                 /* This page is used. Convert it. */
339:
340:                 /* Unscramble the target page. */
341:                 lddb___unscr_phys_page(xpdctx, targetpg,
342:                     CONV_BOTH, pgsize);
343:             }
344:         }
345:     }
346:
347:     return;
348:
349: }
```

Recall that the above lddb_unscr_phys_pages driver routine is called from line 223 of the lddb_unscr_phys function in phase 1 of the conversion process. When called, it loops through every allocation page used in the database as shown at line 262. This same routine is called in both phase 1 and phase 2 and it includes conditional logic to perform the translations appropriate to each phase. In phase 1, the allocation page is unscrambled as provided at line 275. After the allocation page is translated, extents in the allocation unit are read and pages are converted as necessary. Each extent is a portion of an allocation unit containing 8 pages. Extents which are free are skipped as shown at line 289. In the system objects conversion phase (phase 1), extents containing user objects and system tables other than those being translated during phase 1 are skipped as shown at 296-307. Currently, only the SYSOBJECTS, SYSINDEXES and SYBCOLUMNS system tables are translated in phase 1. Similarly, when in phase 2 of the conversion, the above three system tables are skipped (as they have already been translated). In this fashion only the other system table pages and user table pages are converted in phase 2. Pages which are allocated, but not used, are also skipped. This may include, for example, pages which are dropped. The pages that are not skipped are actually translated by a call to lddb_unscr_phys_page as provided at line 341.

The following pseudocode illustrates the lddb_unscr_phys_page function which is called as described above to translate one database page:

```
381: STATIC void
382: lddb___unscr_phys_page(XPDCTX *xpdctx,
     ANYPAGE *targetpg, int conv_mode,
383:     pgsz_t pgsize)
384: {
385:     if (allocpage)
386:     {
387:         /* Unscramble allocation page header */
388:
389:         /* Unscramble the allocation page body */
390:
```

```
391:      return;
392:  }
393:
394:  if (conv_mode != CONV_COL)
395:  {
396:      /* Unscramble common apl page header */
397:
398:      /* Unscramble xheader */
399:
400:  }
401:
402:  if (conv_mode != CONV_COL)
403:  {
404:      /* Unscramble row offset table */
405:
406:  }
407:
408:  /*
409:  ** If this page is data page or index page,
410:  ** and this is a system table or user table,
411:  ** set XPD_SYSTABLE ptr. and XPD_INDDEF ptr.
412:  ** for data row or index row column data conversion.
413:  */
414:  if ((!(pstat & (PG_OAMPG | PG_DISTRIB | PG_TEXT)))
415:      && (conv_mode != CONV_PHYS))
416:  {
417:      if (objid < MINUSERTABLE)
418:      {
419:          xpd_systabp = &xpd_systab_cata[objid];
420:      }
421:      else
422:      {
423:          /*
424:          ** This is a user object.
425:          ** set XPD_SYSTABLE ptr. and XPD_INDDEF ptr.
426:          ** for data row or index row column data conversion.
427:          */
428:          {
429:              /*
430:              ** Search for this object id in the entire
431:              ** xpd_systable array.
432:              */
433:              xpd_systabp = lddb___srch_transdic_usro(
434:                  xpd_systab_usro, objid,
435:                  NULL, NULL, FALSE);
436:
437:              xpdctx->cur_xpd_systab = xpd_systabp;
438:          }
439:      }
440:
441:      indid = targetpg->pindid;
442:
443:      if (indid != 0)
444:      {
445:          /* Locate XPD_INDDEF for this index */
446:          xpd_inddefp = lddb___get_xpdind(xpd_systabp, indid);
447:      }
448:  }
449:
450:  /*
451:  ** Unscramble data row or index row
452:  */
453:  if ((pstat & PG_XHEADER)
454:      && (pstat & PG_DATA))
455:  {
456:      /* Unscramble dol data row page */
457:
458:  }
459:  else if ((pstat & PG_XHEADER)
460:      && (XHDRPAGE_GETPAGETYPE(targetpg) == PG2_DOL_BTREE)
461:      && (((BT_LEAFPAGE *)targetpg)->btl_level == 0))
462:  {
463:      /* Unscramble dol index leaf row page */
464:
465:  }
466:  else if ((pstat & PG_XHEADER)
467:      && (XHDRPAGE_GETPAGETYPE(targetpg) == PG2_DOL_BTREE)
468:      && (((BT_NONLEAFPAGE *)targetpg)->btn_level != 0))
469:  {
470:      /* Unscramble dol index non-leaf row page */
471:
472:  }
473:  else if ((pstat & PG_DATA)
474:      && !(pstat & PG_XHEADER))
475:  {
476:      /* Unscramble APL datapage rows */
477:
478:  }
479:  else if ((!(pstat & PG_XHEADER))
480:      && (((pstat & PG_TYPEMASK) == 0) || /* non-leaf row */
481:      ((pstat & PG_LEAF) && !(pstat & PG_OAMPG))))
482:          /* or leaf row. */
483:          /* Note, PG_LEAF and */
484:          /* PG_OAMCLEANUP is */
485:          /* overloaded. */
486:  {
487:      /* Unscramble APL indexpage index rows */
488:
489:  }
490:  else if (pstat & PG_OAMPG)
491:  {
492:      /* Unscramble OAM page body. */
493:
494:  }
495:  else if (pstat & PG_TEXT)
496:  {
497:      /*
498:      ** Unscramble TEXT page TIPSA.
499:      ** Unscramble st-node.
500:      */
501:  }
502: }
```

The above routine converts various different types of pages, depending upon the page type. For example, if the page is an allocation page, the allocation page header and body are converted as illustrated at lines 385-392. Other types of pages are handled in other portions of the above function. As shown commencing at line 414, if the page is a data page or an index page of a system table or user table, the appropriate translation dictionary is obtained. If the object is system object, its translation dictionary is located in the system object translation dictionary. If the object is user object, a search is made for its translation dictionary in the user translation dictionary by calling lddb___srch_trancdic_usro function as provided at lines 433-435. After the appropriate translation dictionary is obtained, it is used for translation of data row or index row column data. The actual conversion is done by calling lddb___translate (described later in this document).

Phase 2 Conversion Routines

After the system tables have been translated, the second phase of the conversion process commences with a call to the following lddb_unscr_usro function:

```
527: STATIC SYB_BOOLEAN
528: lddb___unscr_usro(XPDCTX *xpdctx, DBTABLE *dbt)
529: {
530:     /*
531:     ** Build a translation dictionary for user table.
532:     */
533:
534:     /* Open sysobjects in this database */
535:
536:     /* Open syscolumns in this database */
537:
538:     /* Open sysindexes in this database */
```

-continued
```
539:
540:    /* Scan SYSOBJECTS */
541:    initarg(tabsdes, (SARG *) NULL, 0);
542:    startscan(tabsdes, SCAN_NOINDEX, SCAN_NORMAL);
543:
544:    /*
545:    ** Get each table in Sysobjects and
546:    ** build translation dictionary for each table.
547:    */
548:    while (getnext(tabsdes))
549:    {
550:      /* For each table */
551:
552:      /* Unscramble only user table */
553:      if (OBJTYPE(objostat.objsysstat) != O_USER)
554:      {
555:        continue;
556:      }
557:
558:      /* get each row in sysindexes for this table */
559:      initarg(indsdes, keys1, 1);
560:      setarg(indsdes, &Sysindexes[IND_TABID], EQ,
561:        (BYTE *)&objostat.objid, sizeof(objostat.objid));
562:      startscan(indsdes, SCAN_CLUST, SCAN_NORMAL);
563:
564:      while(getnext(indsdes))
565:      {
566:        /* For each index */
567:
568:        /*
569:        ** xpd_systab indicates current entry.
570:        ** It could be a new entry which is not used yet.
571:        */
572:        if ((xpd_systab == NULL)
573:        || (xpd_systab->objid != objostat.objid))
574:        {
575:          /*
576:          ** If objid of current xpd_systab is not equal
577:          ** to this user object, then search for this
578:          ** object id in the entire xpd_systable array.
579:          */
580:          xpd_systab = lddb___srch_transdic_usro(
581:              xpd_systab_hdr,
582:              objostat.objid,
583:              xpd_syscol_hdr,
584:              xpd_systab, TRUE);
585:        }
586:
587:        /*
588:        ** Build XPD_SYSCOL translation dictionary
589:        ** for this user table's index(including TABENTRY).
590:        */
591:        lddb___build_transdic_usro(xpdctx, xpd_systab,
592:            typetransp, objostat.objid, indid,
593:            (((objostat.objsysstat2 & O2_LOCK_ALLPAGES) ||
594:             !(objostat.objsysstat2 &
595:               (O2_LOCK_DATAPAGES |
O2_LOCK_DATAROWS)))
596:            ? TRUE : FALSE),
597:            colsdes, indptr, FALSE);
598:
599:      }
600:
601:      /*
602:      ** Finished all data/index columns for this table.
603:      ** Copy translation dictionary from the buffers.
604:      */
605:      if (!lddb___copy_transdic(xpdctx, xpd_systab,
xpd_syscol_hdr))
606:      {
607:        /* No memory for translation dict. */
608:      }
609:    }
610:
611: finish_work:
612:
613:    /* Release memory for user translation dictionary buffers */
614:
615:    /* close sysindexes */
616:
617:    /* close syscolumns */
618:
619:    /* close sysobjects */
620:
621:    /* Unscramble physical layout and user data in user objects. */
622:    if ( retcode )
623:    {
624:      lddb___unscr_phys_usro(xpdctx, dbt);
625:    }
626:
627:    /* Release memory for user objects' translation dictionary */
628:    lddb___unscr_free_dictpages(xpd_systab_hdr->next);
629:
630:    lddb_unscr_free_dictpages(xpd_syscol_hdr->next);
631:
632:    return (retcode);
633: }
```

Recall that this lddb_unscr_usro function is called from line 134 of the main lddb_unscramble driver function (illustrated above) to perform phase 2 of the cross-platform conversion. When called, this function builds a translation dictionary for all user tables. Initially, the SYSOBJECTS, SYSCOLUMNS, and SYSINDEXES system tables are opened and a function is called to prepare to scan. The getnext function shown at line 548 actually reads the system table to get one row (i.e., one user object) from SYSOBJECTS. As shown at lines 553-556, if the object is not a user object (user table), it is skipped. However, if it is a user object, the SYSINDEXES system table is scanned for this user object to get the index definition. The getnext function at line 564 gets one row from the SYSINDEXES system table. A translation dictionary is created for each index definition. If this is a new user object, a new translation dictionary entry xpd_systab is allocated. If this is not a new user object, the user translation dictionary is searched for the object by calling lddb___srch_transdic_usro. Also, the data definition is included in the SYSINDEXES system table (as a special case of index). Accordingly, by scanning the SYSINDEXES system table, the definition of both data and indexes is obtained. The translation dictionary for the data or index is actually built through the call to lddb_build_transdic_usro at lines 591-597. The above process is repeated for all user tables. When this work is finished and the translation dictionaries for the user objects have been build, the SYSINDEXES, SYSCOLUMNS, and SYSOBJECTS system tables are closed and the actual translation of the user tables commences with a call to lddb_unscr_phys_usro at line 624. The functions that are called during the process of building a translation dictionary for a user object and the function that performs the actual translation are described below.

The following lddb_build_transdic_usro routine is called to build a user dictionary for a user object:

```
980: STATIC void
981: lddb___build_transdic_usro(XPDCTX *xpdctx,
982:     XPD_SYSTABLE *xpd_systab, TYPE_TRANS *typetransp,
983:     objid_t objid, indid_t indid, SYB_BOOLEAN apl_table,
984:     SDES *colsdes, INDEX_ONDISK *indptr, SYB_BOOLEAN
ind_only)
985: {
986:
987:   if ((indid == TABENTRY || indid == CLUSTIND)
988:     && (!ind_only))
989:   {
990:     /*
```

```
 991:    ** Build translation dictionary for data rows
 992:    ** from syscolumns.
 993:    */
 994:
 995:    /* get each column in syscolumns for this table */
 996:    initarg(colsdes, keys1, 1);
 997:    setarg(colsdes, &Syscolumns[COL__OBJID], EQ,
 998:       (BYTE *)&objid, sizeof(objid));
 999:    startscan(colsdes, SCAN_CLUST, SCAN_NORMAL);
1000:
1001:    /* For each column */
1002:    while(getnext(colsdes))
1003:    {
1004:       /* Locate syscolumns row */
1005:       colptr = (COLUMN *) colsdes->srow;
1006:
1007:       /*
1008:       ** Loading from current version(12.5.x), or
1009:       ** the trace flag is set off.
1010:       ** When row translation happens, getnext( )
1011:       ** returns modern row format, so we don't
1012:       ** need to worry about the old format.
1013:       ** (Modern version of COLUMN on 12.5 and
1014:       ** later)
1015:       */
1016:       coloffset = GETSHORT(&colptr->coffset);
1017:       coltype = colptr->cstype;
1018:       colid = GETSHORT(&colptr->ccolid);
1019:       collen = GETLONG(&colptr->cslength);
1020:
1021:       /* Build a XPD_SYSCOL for this column. */
1022:       cur_xpdcol = lddb___build_transdic_syscol(xpdctx,
1023:          cur_xpdcol, &numxpdscol, typetransp, coloffset,
1024:          coltype, colid, collen, objid, cxstatus, TRUE);
1025:
1026:    }
1027:
1028:    /* Build XPD_SYSTABLE translation dictionary. */
1029:    xpd_systab->table_size = numxpdscol;
1030:
1031: }
1032:
1033: if ((indid > TABENTRY)
1034:    && (indid != TXTENTRY))
1035: {
1036:    /*
1037:    ** Build translation dictionary for index rows
1038:    ** from sysindexes, including CLUSTIND.
1039:    */
1040:
1041:    /* Locate next free XPD_INDDEF entry for this index. */
1042:
1043:    /*
1044:    ** Locate next free xpd_syscol by number of xpd_syscol
1045:    ** in buf_isyscol
1046:    */
1047:
1048:    /* Locate sysindexes row */
1049:    keycnt = GETSHORT(&indptr->indkeycnt);
1050:
1051:    for (i = 0; i < keycnt; i++)
1052:    {
1053:       if (xpdctx->upgdvers < V12_5_0_UPGDVERS_ID)
1054:       {
1055:          /* Old version of SARG_ONDISK on pre-12.5 */
1056:          o_sargp = (SARG_ONDISK_V0 *) &indptr->indkey[0];
1057:          colid = (uint16) o_sargp[i].sacolid;
1058:          coloffset = GETSHORT(&o_sargp[i].saoffset);
1059:          coltype = o_sargp[i].satype;
1060:          collen = (collen_t) o_sargp[i].salen;
1061:       }
1062:       else
1063:       {
1064:          /* Modern version of SARG_ONDISK on 12.5 */
1065:          colid =
1066:             GETSHORT(&indptr->indkey[i].sa.cqs_colid);
1067:          coloffset =
1068:             GETSHORT(&indptr->indkey[i].sa.cqs_coloff);
1069:          coltype = indptr->indkey[i].sa.cqs_coltype;
1070:          collen =
1071:             GETLONG(&indptr->indkey[i].sa.cqs_collen);
1072:       }
1073:
1074:       /* Build a XPD_SYSCOL for this index key column. */
1075:       cur_xpdcol = lddb___build_transdic_syscol(xpdctx,
1076:          cur_xpdcol, &numxpdscol, typetransp, coloffset,
1077:          coltype, colid, collen, objid, (int32)UNUSED,
1078:          apl_table);
1079:    }
1080:
1081:    /* Build XPD_SYSTABLE translation dictionary. */
1082:    xpd_systab->ind_howmany++;
1083:
1084:    /*
1085:    ** set the number of xpd_syscol entries
1086:    */
1087:    xpd_inddef->column_count = numxpdscol;
1088:
1089: }
1090:
1091:    return;
1092: }
```

The above function creates an XPD_SYSCOL array for columns, or a XPD_INDDEF array and a XPD_SYSCOL array for each index for a user table. The while loop commencing at line 1002 scans the SYSCOLUMNS system table to get each column definition and to build a translation dictionary for data rows from this definition. As shown, it reads one row (column definition) for this user object from SYSCOLUMNS and builds an XPD_SYSCOL translation dictionary for this column. This is repeated for all columns for the user table. A translation dictionary is then built for index rows from SYSINDEXES. This is done by locating an index key definition in the SYSINDEXES row for this index and building an XPD_SYSCOL translation dictionary for this index key column. This is repeated for all index key columns in this index.

The lddb_unscr_phys_usro function which is called by the above lddb_unscr_usro function is as follows:

```
656: STATIC void
657: lddb___unscr_phys_usro(XPDCTX *xpdctx, DBTABLE * dbt)
658: {
659:    /* Let's unscramble page physical format and user objects */
660:
661:    lddb___unscr_phys_pages(xpdctx, dbt, startpgno, endpgno,
FALSE);
662:
663:    return;
664: }
```

As shown, the above lddb_unscr_phys_usr function simply calls the previously-described lddb_unscr_phys_pages function. In this pass, the user objects, rather than the system objects, are translated.

Translation Routine

The below pseudocode illustrates the lddb_translate function, which is the actual translation routine that performs the translation of various database objects:

```
821: STATIC void
822: lddb___translate(XPDCTX *xpdctx, XPD_SYSCOL *xpdsyscolp,
int32 tablesize,
823:    BYTE *targetp, int minlen, int rowfmt, int dyn_iter, BYTE *
```

```
targetpg)
824: {
825:
826:    /*
827:    ** Walk all XPD_SYSCOL array for this table, index or
828:    ** complex system control structure.
829:    */
830:    for (i = 0; i < tablesize; i++)
831:    {
832:        /*
833:        ** If extended type, (this is system control data only)
834:        */
835:        if (itranstype == EXT_TYPE)
836:        {
837:            /*
838:            ** Locate sub dictionary XPD_SYSCOL.
839:            **
840:            ** Currently, XPD_INDDEF in encoded translation
841:            ** dictionary has only one array element.
842:            ** Just use the first element in the XPD_INDDEF.
843:            **
844:            ** This is encoded translation dictionary.
845:            ** XPD_INDDEF.column_list is a virtual object id,
846:            ** not an offset to XPD_SYSCOL sub dictionary.
847:            ** Use GET_XPD_SYSTABLE_PTR macro.
848:            */
849:            xpd_systabp = GET_XPD_SYSTABLE_PTR(
850:                subxpdindp->column_list, xpdctx);
851:            subxpdcol = xpd_systabp->table;
852:
853:            /*
854:            ** Repeat for itercount for this extended type.
855:            */
856:            while( --iitercount >= 0 )
857:            {
858:                /*
859:                ** Walk all XPD_SYSCOL in this sub dictionary.
860:                */
861:                for (j = 0; j < subxpdindp->column_count; j++)
862:                {
863:                    itranstype = subxpdcol[j].transtype;
864:                    isubitercount = subxpdcol[j].itercount;
865:
866:                    /*
867:                    ** Look up the type translation
868:                    ** function pointer for this
869:                    ** translation type.
870:                    */
871:                    transtype_func =
872:                        &Transtype_func[itranstype];
873:
874:                    /*
875:                    ** Call a primitive byte-swap
876:                    ** function, i2, i4 or i8.
877:                    */
878:                    (*transtype_func->xpdswap_func)
879:                        ((BYTE *)(targetp +
880:                            icoloffset +
881:                            subxpdcol[j].coloffset +
882:                            iitercount * icollen),
883:                        (size_t)isubitercount);
884:                }
885:            }
886:            /* continue to the next main xpd_syscol entry */
887:            continue;
888:        }
889:
890:        /* Take care of variable length column and dol non-leaf row. */
891:        if ((icoloffset < 0)
892:        || (rowfmt == BT_NROWFORMAT))
893:        {
894:            /*
895:            ** Locate the variable length column,
896:            ** or the fixed length column in DOL non-leaf row which
897:            ** needs to add length of child page id and length of
898:            ** fixed columns, depending on the row format(duplicate/
899:            ** non-duplicate/suffix-compression).
900:            */
901:            target_colp = collocate(targetp, (int)icoloffset,
902:                minlen, (int)icollen, rowfmt,
903:                &collen);
904:        }
905:        else
906:        {
907:            /* fixed length column in a row or field in a struct */
908:            target_colp = targetp + icoloffset;
909:            collen = 0;
910:        }
911:
912:        transtype_func = &Transtype_func[itranstype];
913:
914:        /*
915:        ** Look up the type translation function pointer
916:        ** for this translation type.
917:        */
918:        if (transtype_func->xpdswap_func != NULL)
919:        {
920:            /* Call a primitive byte-swap function, i2, i4 or i8 */
921:            (*transtype_func->xpdswap_func)((BYTE *)(target_colp),
922:                (size_t)iitercount);
923:        }
924:        else if (transtype_func->trans_func != NULL)
925:        {
926:            /* Call a special translation function */
927:            (*transtype_func->trans_func)(xpdctx,
928:                (BYTE *)target_colp,
929:                (BYTE *)targetp,
930:                targetpg,
931:                transtype_func->v_oid);
932:        }
933:        else
934:        {
935:            /* Call this generic translation function recursively */
936:            xpd_systabp = GET_XPD_SYSTABLE_PTR(
937:                transtype_func->v_oid, xpdctx);
938:
939:            /* Do translation */
940:            lddb__translate(xpdctx, xpd_systabp->table,
941:                xpd_systabp->table_size,
942:                (BYTE *)target_colp, (int)UNUSED,
943:                (int)UNUSED, (int)UNUSED,
944:                (BYTE *)targetpg);
945:        }
946:    }
947: }
```

The lddb_translate function is called from the above lddb_unscr_phys_page function to perform the actual translation of each field or column using the translation definitions. As shown at line 891, if this is a variable length column in a row, the column in the row is located by calling a collocate function. Otherwise, if it is not a variable length column, the else condition at line 905 applies. For a fixed length column in a row or a field in a structure, the column/field is located by using the "icoloffset" value in the XPD_SYSCOL. A translation function is then executed based on the translation type in this XPD_SYSCOL. If the translation type is a primitive type, then a primitive byte-swap function is called (xpd_swap_msb_i2( ), xpd_swap_msb_i4( ), or xpd_swap_msb_i8( )) to perform the actual byte swaps. If the translation type is a special translation type, a special translation function is called for translation of special translation types as shown at lines 924-945. For example, a special translation function is called for SARG structures. The lddb___translate function is called recursively with the virtual object id for this translation type.

Each function (xpd_swap_msb_i2( ), xpd_swap_msb_i4 ( ), or xpd_swap_msb_i8( )) generally includes a pointer (ptr) to a possibly unaligned buffer that it will translate in place; and a number of items in the buffer. The buffer size is given as number-of-elements, not total-buffer-size, because each element to be translated has a known size, and the system is focused on making the functions work efficiently over arrays. Functions also test for pointer alignment, and work efficiently if the pointer is aligned. In addition to the translator functions, each kind of aggregate has a driver: OAM pages, for example, need the intelligence to sort out the parts of an OAM page, as do allocation pages. These drivers may be based on the database's upgrade version: the "row" driver is a prime example, but other things such as allocation pages have also changed over time. Note that this means that when building a dictionary for processing system objects, that dictionary must be predicated on the database's upgrade version. The only way to know what those objects look like is to know how far the database has been upgraded. For speed, the system takes advantage of the translator functions' ability to handle arrays. This can save many function calls by aggregating changes into groups that look alike. For instance, DOL system tables will tend to have an int16 column as the first data field, it may be possible to aggregate that into the DOL header, giving an array of int16 to be translated instead of calling once for the header and once for the first column. Note that for all tables, the system works from a SYSTABLE definition to build the XPD_* definitions. Index INDDEF descriptions refer back to the index of a SYSCOL array entry for index column data, but that data is lost when aggregating columns for XPD_SYSCOL descriptions.

Using Dump and Load in a Cross-Platform Environment

The methodology of the present invention requires no changes to the DUMP DATABASE function. This allows existing database dump files to be processed for the cross-platform conversion and also eliminates any need to upgrade or make changes to the source database server (e.g., Sybase ASE database server). The currently supported database dump file versions include ASE versions 11.9.x, 12.0.x, 12.5.x (i.e., 11.9 upwards). As with traditional database dump operations, the database should be transactionally quiescent before the DUMP command is executed, and the cross-platform conversion modules of the present invention include functionality for checking syslog records to ensure that this is the case before processing the database dump file.

The cross-platform conversion functionality of the present invention is implemented internally as part of the LOAD DATABASE function for the target database server, without any syntax changes to the LOAD command. The data conversion operations are performed automatically when LOAD DATABASE is invoked on the target platform (server). During the LOAD DATABASE operation, the byte storage of the database dump file is automatically detected. If the byte storage of the target server differs, then the system of the present invention performs the conversion to the new byte order as the database dump file is processed. If byte reordering is required, there generally is a performance impact on loading the database. Depending on the schema and data types involved, this may be 2-3 times more intensive than processing a database dump from the same byte order architecture as the target server.

Preparing the Database for Conversion

Although there are no syntax changes to the ONLINE DATABASE command, the database server in which the present invention is implemented will automatically execute some additional operations after a cross-platform database load has completed when ONLINE DATABASE is invoked. After a cross-platform load, the system currently will perform the following operations:

1. Truncate syslogs using the completion of the load as a new checkpoint.

2. Fix up colidarray in sysstatistics, regenerating it using the new byte-order.

3. Check and rebuild indexes on system tables if they need to be regenerated.

4. Mark suspect user tables indexes (except clustered index on APL (all-pages-locked) table).

Currently, user table indexes may need to be rebuilt after the byte-order conversion to re-optimize the search path because of changes to index row identifiers. Suspect indexes can be identified using the sp_indsuspect stored procedure. Recreating these indexes for large tables can be a lengthy process, so several options are provided. The indexes on the target server can be fixed by manually dropping and recreating them, or by using a new stored procedure. The new stored procedure, sp_post_xpload, checks the user table indexes that have been marked suspect and rebuilds them if necessary. It checks and rebuilds the following indexes: non-clustered index on APL table; clustered index on DOL (data-only-locked) table; and non-clustered index on DOL table. Completion of the stored procedure clears the suspect status of these indexes. It is currently recommended to manually drop and recreate indexes for databases larger than 10 Gb, and use the stored procedure to fix indexes in a single process for smaller databases.

Cross-Platform Migration and Restrictions to be Observed

The cross-platform database dump and load capabilities of the present invention provide a database management system with significantly expanded capabilities to handle database transfer and restore across versions, operating systems and platform architectures. Database dump and load is generally much faster than other data transfer methods, so eliminating the previous cross-platform constraints makes it much faster and easier to manage data migration and other cross-platform operations. The present invention also makes it possible to easily reload databases across platform combinations such as between Unix to Linux platforms and between 32-bit and 64-bit architectures, or between other platforms with different byte-storage architectures. This includes backward compatibility with database dumps created with certain older database management system versions. This enhanced flexibility makes it much simpler to manage databases and handle database migration in cross-platform environments. However, the following restrictions and suggested operations are currently recommended for a cross-platform migration:

1. The database should be transactionally quiescent when the DUMP DATABASE command is used.

2. Loading database dumps from certain older database servers is currently not supported. In other words, there may be a restriction for the load of the dump file from some older database server system versions.

3. Loading a master database is currently subject to restrictions.

4. Cross-platform loading is only available for database dumps, not transaction dumps.

5. Cross-platform loading of password-protected dump files is currently not supported.

6. Cross-platform dumping or loading using a remote backup server is currently not supported.

7. Cross-platform loading of parsed XML objects is currently not supported.

8. Cross-platform loading of embedded data structures stored in binary, varbinary, or image columns is currently not supported. The database server currently may not translate embedded data structures that users store as (var)binary or image column, because the system may not be able to determine how to translate those structures. An interface may be used to enable users to provide necessary information about those embedded structures.

9. After cross-platform load, all stored procedures and other compiled objects are recompiled from source text at the first execution. This can be done proactively if desired (e.g., using dbcc upgrade object). After the database is loaded, the first execution of every stored procedure generates a query plan from the text in syscomments, instead of a query tree in sysprocedures. No performance degradation should occur because the recompile of stored procedure from text happens only at the first execution after the cross platform load. Recompiling from query tree in sysprocedures also happens for regular database load from same platform if the database server versions are same.

System Stored Procedure sp_post_xpload: This is a new stored procedure. Users currently should run this stored procedure to check and rebuild indexes on user tables after cross platform database load, due to a known issue with sort order of index RID key. This stored procedure checks the following indexes and rebuilds them if necessary: a) non-clustered index on APL table; b) clustered index on DOL table, and c) non-clustered index on DOL table. Suspect status on the indexes are cleared when this stored procedure is run.

While the invention is described in some detail with specific reference to a single-preferred embodiment and certain alternatives, there is no intent to limit the invention to that particular embodiment or those specific alternatives. Although the above discussion describes the use of the system and methodology of the present invention with database dump and load commands, the present invention can also be used in other circumstances in which a database is migrated between platforms. For instance, the present invention can also be use in conjunction with database Unmount and Mount commands. As another example, a database device can be copied from a first platform to a second platform having a different underlying byte storage architecture and the present invention used to convert the database for operation on the second platform when the database is started on the second platform. Accordingly, those skilled in the art will appreciate that modifications may be made to the preferred embodiment without departing from the teachings of the present invention.

What is claimed is:

1. A method for migrating a database across platforms having different byte order formats, the method comprising:
   loading a database from a source platform having a particular byte order format onto a target platform having a different byte order format; wherein said byte order format comprises a big-endian byte order format in which most significant byte in a sequence is stored at the lowest storage address or a little-endian byte order format in which least significant byte in a sequence is stored at the lowest storage address;
   identifying particular portions of the database to be converted to the byte order format of the target platform; and
   converting said particular portions of the database to the byte order format of the target platform so as to enable the database to operate on the target platform.

2. The method of claim 1, further comprising:
   detecting the byte order format of the database loaded onto the target platform.

3. The method of claim 2, wherein said detecting step includes detecting the byte order format from an archive file header.

4. The method of claim 1, wherein said identifying step includes examining column definition information and index key column information derived from the database.

5. The method of claim 1, wherein said identifying step includes substeps of:
   building a system translation dictionary based on column definition information and index key column information derived from the database; and
   translating objects of the database to the byte order format of the given platform using the system translation dictionary.

6. The method of claim 5, wherein said objects include system tables and system control data.

7. The method of claim 5, further comprising:
   building a user translation dictionary based on the converted objects.

8. The method of claim 7, wherein said converting step includes converting said particular portions of the database using the user translation dictionary.

9. The method of claim 7, wherein the user translation dictionary indicates type of conversion to be performed on particular columns and indexes of the database.

10. The method of claim 1, wherein said converting step includes converting float and integer datatypes using a byte swap method.

11. The method of claim 10, wherein said converting step includes converting complex datatypes which are based on float or integer datatypes.

12. A computer-readable medium having processor-executable instructions for performing the method of claim 1.

13. A method for converting a database operating on a source platform having a certain endian type for operation on a target platform having a different endian type, the method comprising:
   loading a database from a source platform having a certain endian type onto a target platform having a different endian type; wherein one platform has a big-endian byte storage format in which most significant byte in a sequence is stored at the lowest storage address and the other platform has a little-endian byte storage format in which least significant byte in a sequence is stored at the lowest storage address;
   translating objects of the database to the target platform's endian type;
   determining particular portions of the database to be converted based on scanning the translated objects of the database; and
   for each particular portion of the database, converting said particular portion to the target platform's endian type so as to enable the database to operate on the target platform.

14. The method of claim 13, wherein said translating step includes translating objects based on column definition information and index key column information derived from the database.

15. The method of claim 13, wherein said translating step comprises substeps of:
   building a system translation dictionary based on column definition information and index key column information derived from the database; and
   translating objects of the database using the system translation dictionary.

16. The method of claim 13, wherein said translating step includes translating system control information.

17. The method of claim 13, wherein said translating step includes translating allocation pages of the database.

18. The method of claim 17, wherein said determining step includes determining particular portions corresponding to allocated pages identified in said allocation pages.

19. The method of claim 13, wherein said determining step includes determining columns having float or integer datatypes.

20. The method of claim 13, wherein said converting step includes converting each particular portion using a byte swap function.

21. The method of claim 20, wherein said byte swap function comprises a selected one of a 2 byte swap function, a 4 byte swap function, and an 8 byte swap function.

22. The method of claim 13, wherein said objects include system tables and system control data of the database.

23. A system for converting a database operating on a first platform having a certain endian type for operation on a second platform having a different endian type, the system comprising:
a module stored on computer memory, which when executed would cause the computer to:
translate system objects of the database to the endian type of the second platform;
determine particular portions of the database to be converted to the endian type of the second platform based on the translated system objects; and
convert the particular portions of the database to the endian type of the second platform;
wherein an endian type comprises a selected one of a big-endian byte order format in which most significant byte in a sequence is stored at the lowest storage address and a little-endian byte order format in which least significant byte in a sequence is stored at the lowest storage address.

24. The system of claim 23, wherein the translation of system objects includes building a system translation dictionary for translation of system objects of the database.

25. The system of claim 24, wherein the system translation dictionary is built based, at least in part, on index key definitions derived from the database.

26. The system of claim 24, wherein the system translation dictionary is built based, at least in part, on column definitions derived from the database.

27. The system of claim 23, wherein the translation of system objects includes translating allocation pages and system control data.

28. The system of claim 23, wherein determining particular portions of the database to be converted includes constructing s a user translation dictionary based on the translated system objects, the user translation dictionary listing particular columns and indexes of the database to be converted.

29. The system of claim 28, wherein the user translation dictionary indicates type of conversion to be performed on particular columns and indexes of the database.

30. The system of claim 28, wherein the particular columns and indexes are converted using a byte swap function.

31. A method for migrating a database to a target platform having a particular byte order format, the method comprising:
determining the byte order format of the database when the database is loaded on the target platform;
translating system tables of the database from the determined byte order format to the particular byte order format of the target platform;
building a translation dictionary identifying particular portions of the database to be converted based on scanning the translated system tables of the database; and
converting the particular portions of the database to the particular byte order format of the target platform based on the translation dictionary for enabling the database to operate on the target platform; wherein the particular byte order format comprises a selected one of a big-endian byte order format in which most significant byte in a sequence is stored at the lowest storage address and a little-endian byte order format in which least significant byte in a sequence is stored at the lowest storage address.

32. The method of claim 31, wherein said translating step includes substeps of:
building a system translation dictionary based on column definition information and index key column information derived from the database; and
translating system tables of the database using the system translation dictionary.

33. The method of claim 31, wherein said translating step includes translating system control information.

34. The method of claim 31, wherein said translating step includes translating allocation pages of the database.

35. The method of claim 31, wherein said translation dictionary lists particular columns and indexes of the database to be converted.

36. The method of claim 35, wherein said translation dictionary describes type of conversion to performed on said particular columns and indexes.

37. The method of claim 31, wherein said converting step includes converting the particular portions of the database using a byte swap method.

38. The method of claim 37, wherein the byte swap method comprises one or more of a 2 byte swap, a 4 byte swap, and an 8 byte swap.

39. A system providing for conversion of a database across platforms having different byte storage formats wherein said byte storage formats include a big-endian byte storage format in which most significant byte in a sequence is stored at the lowest storage address and a little-endian byte storage format in which least significant byte in a sequence is stored at the lowest storage address, the system comprising:
means for detecting the byte storage format of the database when the database is loaded on a particular platform;
means for identifying portions of the database to be converted from the detected byte storage format to the byte storage format of the particular platform; and
means, responsive to said means for identifying, for converting portions of the database to the byte storage format of the particular platform.

40. The system of claim 39, wherein said means for identifying selects particular columns of tables of the database to be converted based, at least in part, on datatypes of said particular columns.

41. The system of claim 40, wherein said means for converting converts said particular columns using a byte swap method.

42. The system of claim 39, wherein said means for identifying determines portions of the database to be converted based, at least in part, upon scanning system tables of the database to identify fields and indexes to be converted.

43. The system of claim 39, wherein the database is loaded on the particular platform from an archive file.

44. The system of claim 43, wherein the archive file comprises a database dump file.

* * * * *